US011157248B2

(12) United States Patent
Pardo-Castellote et al.

(10) Patent No.: US 11,157,248 B2
(45) Date of Patent: Oct. 26, 2021

(54) RECIPE-DRIVEN INTERPRETER FOR DATA SAMPLE MANIPULATION FOR DDS TOPIC TYPES

(71) Applicant: Real-Time Innovations, Inc., Sunnyvale, CA (US)

(72) Inventors: Gerardo Pardo-Castellote, Santa Cruz, CA (US); Erin Adams McManus, Sunnyvale, CA (US); Fernando Crespo Sanchez, San Jose, CA (US)

(73) Assignee: Real-Time Innovations, Inc., Sunnyvale, CA (US)

( * ) Notice: Subject to any disclaimer, the term of this patent is extended or adjusted under 35 U.S.C. 154(b) by 95 days.

(21) Appl. No.: 16/798,701

(22) Filed: Feb. 24, 2020

(65) Prior Publication Data
US 2020/0278846 A1 Sep. 3, 2020

Related U.S. Application Data

(60) Provisional application No. 62/811,739, filed on Feb. 28, 2019.

(51) Int. Cl.
*G06F 9/44* (2018.01)
*G06F 8/40* (2018.01)
*G06F 8/30* (2018.01)

(52) U.S. Cl.
CPC . *G06F 8/40* (2013.01); *G06F 8/30* (2013.01)

(58) Field of Classification Search
CPC ..................................... G06F 8/40; G06F 8/30
See application file for complete search history.

(56) References Cited

U.S. PATENT DOCUMENTS

2007/0185591 A1* 8/2007 Frei .................... G06F 16/88
 700/22
2010/0115041 A1* 5/2010 Hawkins ............. G06Q 10/107
 709/206

(Continued)

OTHER PUBLICATIONS

Jose M.Lopez-Vega, "A content-aware bridging service for publish/subscribe environments", Jan. 2013, Elsevier, vol. 86, pp. 108-124 (Year: 2013).*

*Primary Examiner* — Wei Y Zhen
*Assistant Examiner* — Amir Soltanzadeh
(74) *Attorney, Agent, or Firm* — Lumen Patent Firm

(57) ABSTRACT

A bidirectional conversion method is provided between a memory representation and a network representation of data samples associated with a DDS type in a system using an Object Management Group DDS and a Real-Time Publish Subscribe (RTPS) protocol that is more potent, maintainable, and with a smaller footprint. A first conversion recipe is generated using a type description and a language binding information that transforms any data sample associated with the type description from a first memory representation to a network representation, and this first conversion recipe is generated only once. A second conversion recipe is generated using a type description and language binding information that transforms any data sample associated with the type description from the network representation to a second memory representation, and this second conversion recipe is generated only once. Both generated first and second conversion recipes are then executed on all data samples.

25 Claims, 22 Drawing Sheets

(56) References Cited

U.S. PATENT DOCUMENTS

2011/0295923 A1\* 12/2011 de Campos Ruiz .... G06F 9/542
709/201
2012/0246295 A1\* 9/2012 Gonzalez-Banos .........................
H04L 12/1822
709/224

\* cited by examiner

«Interface»
SampleAccessor

+ typeSize: Integer
+ languageBinding: LanguageBindingKind

+ getMemberValue(sample: Sample, in memberOffset: Integer, in elementIndex: Integer): MemberValue
+ setMemberValue(sample: Sample, in memberOffset: Integer, in elementIndex: Integer, in value: MemberValue)
+ setMemberValueCount(sample: Sample, in memberOffset: Integer, in Count: Integer)
+ getMemberValueCount(sample: Sample, in memberOffset: Integer)

FIG. 10

<<Interface>>
UserTypePlugin

+ serialize()
+ serializeKey()
+ deserialize()
+ deserializeKey()
+ skip()
+ serializedSampleToKey()
+ getSerializedSize()
+ getMaxSerializedSize()
+ getMinSerializedSize()

FIG. 11

| Type | C size | XCDR1 and XCDR2 size |
|---|---|---|
| boolean | 1 | 1 |
| byte | 1 | 1 |
| uint8 | 1 | 1 |
| int16 | 2 | 2 |
| uint16 | 2 | 2 |
| int32 | 4 | 4 |
| uint32 | 4 | 4 |
| int64 | 8 | 8 |
| uint64 | 8 | 8 |
| float32 | 4 | 4 |
| float64 | 8 | 8 |
| float128 | 16 | 16 |
| char8 | 1 | 1 |
| char16 | 2 | 2 |

FIG. 14

| Type | C alignment[1] | XCDR1 alignment | XCDR2 alignment |
|---|---|---|---|
| boolean | 1 | 1 | 1 |
| byte | 1 | 1 | 1 |
| int8 | 1 | 1 | 1 |
| uint16 | 2 | 2 | 2 |
| int32 | 4 | 4 | 4 |
| uint32 | 4 | 4 | 4 |
| int64 | 8 | 8 | 4 |
| uint64 | 8 | 8 | 4 |
| float32 | 4 | 4 | 4 |
| float64 | 8 | 8 | 4 |
| float128 | 16 | 16 | 4 |
| char8 | 1 | 1 | 1 |
| char16 | 2 | 2 | 2 |

FIG. 15

RECIPE-DRIVEN INTERPRETER FOR DATA SAMPLE MANIPULATION FOR DDS TOPIC TYPES

CROSS-REFERENCE TO RELATED APPLICATIONS

This application claims priority from U.S. Provisional Patent Application 62/811,739 filed Feb. 28, 2019, which is incorporated herein by reference.

FIELD OF THE INVENTION

This invention relates to distributed systems that employ a publish-subscribe data exchange in which applications publish data samples, which become available to remote applications interested in them. Specifically, this invention relates to Data Distribution Service (DDS) for Real-time Systems which is a specification of a publish/subscribe middleware for distributed systems.

BACKGROUND OF THE INVENTION

Data Distribution Service and Type System

Distributed systems typically employ a publish-subscribe data exchange in which applications publish data samples, which become available to remote applications interested in them. Data Distribution Service (DDS) for Real-time Systems is a specification of a publish/subscribe middleware for distributed systems. As a networking middleware, DDS simplifies network programming. DDS implements a publish/subscribe model for sending and receiving data samples among software applications. The software applications create publishing and subscribing endpoints.

The publishing endpoints, called DataWriters, publish data samples for a Topic (e.g. image, temperature, location). The subscribing endpoints, called DataReaders, receive the data samples published by the DataWriters on a Topic.

DDS takes care of delivering the data samples to all DataReaders that declare an interest in a Topic. Delivering a sample requires marshalling the sample. Marshalling is the process of transforming the memory representation of a data sample to a serialized representation suitable for transmission over the network.

In DDS, the memory representation of a data sample is determined by the language binding. The language binding specifies the programming-language mechanisms an application can use to construct and introspect data samples. For a giving programming language there can be multiple language bindings.

In DDS, the serialized network representation (or wire representation) of a data sample is called Extended Common Data Representation (CDR), and there are two versions: Extended CDR (encoding version 1) (XCDR1) and Extended CDR (encoding version 2) (XCDR2). The representations are defined in the Object Management Group (OMG) Extensible and Dynamic Topic Types for DDS (DDS-XTYPES) specification.

Each publishing or subscribing endpoint (DataWriter or DataReader) is associated with a type that defines the structure for all data samples sent by the DataWriter or received by the DataReader. DDS-XTYPES describes the DDS Type System comprising the following types:

Primitive types: Boolean, Byte, Int8, UInt8, Int16, UInt16, Int32, UInt32, Int64, UInt64, Float32, Float64, Float128, Char8, Char16.

Strings: They can be strings of single-byte characters as well as of wide characters Constructed types: enumerations and bitmasks.

Alias types

Collection types: Single and multi-dimensional arrays, variable-length sequences, variable-length maps of other types.

Aggregated types: Structures and unions.

Annotation types: Types that may be used to annotate other types.

The top-level types, or the types that can be associated directly with a Topic, are structures or union types. Types can be described in multiple languages including XML (eXtensible Markup Language) and IDL (Interface Definition Language). For example, the following IDL snippet defines a type for a camera image topic called CameraImage. This type is a structure type that contains members that have themselves a type:

```
struct Resolution {
    int32 height;
    int32 width;
};
struct CameraImage {
    @key int32 cameraId;
    Resolution resolution;
    sequence<octet> pixels;
};
```

A data sample for the type above is a concrete camera image.

Types can have some of their members marked with annotations. There are four important annotations for a member that are relevant to this invention:

@key: Indicates that a member is part of the topic key (e.g. cameraId). A unique value for the key identifies a unique instance of the topic. Each data sample for a keyed topic represents the value of an instance at a specific point in time.

@optional: Indicates that a member value is optional. When the value is not set, it is not sent on the wire.

@external: Usually when a data sample is mapped in memory, it is implemented as a whole, meaning that, when feasible, its data members are placed next to each other in a single data space. This annotation forces the annotated member to be put elsewhere, in a dedicated place.

@max, @min, @range: Specifies the valid range for the value of a primitive member. For example:

```
struct Resolution {
    @range(min=600, max=1080)
    int32 height;
    @min(800) @max(1920)
    int32 width;
};
```

The Extended CDR, used to send and receive data samples on the network, supports data type evolution. That is, it allows a data type to change in certain well-defined ways without breaking communication. Types can be marked with the following annotations to indicate the kind of evolution that they support:

@final: Types marked as final cannot evolve.

@appendable: Types marked as appendable can evolve by adding (or removing) members at the end.

@mutable: Types marked as mutable can evolve by reordering, adding, or removing members.

To support type evolution, the wire representation defines a set of headers that can be added at the beginning of an aggregated type (DHEADER), before each member within the aggregated type (EMHEADER), and at the end of an aggregated type (SENTINEL).

Among other information, the headers encode the size of the content they apply to. EMHEADERs also include a unique ID for a member in a mutable type. The SENTINEL header is only applicable to mutable types with Extended CDR (encoding version 1).

DHEADERs allow extending a type by adding members at the end. Types marked as appendable and mutable add a DHEADER at the beginning when the network representation is XCDR2. For example:

```
@appendable
struct Position2D {
    int32 x;
    int32 y;
};
// Position3D represents the next version of the Position type
@appendable
struct Position3D {
    int32 x;
    int32 y;
    int32 z;
};
```

Position2D wire format is shown in FIG. 3A and Position3D wire format is shown in FIG. 3B.

EMHEADERs allow evolving a type by adding members in the middle or reordering existing members. The header is applicable to mutable types.

```
@mutable
struct Position2D {
    @id(1) int32 x;
    @id(2) int32 y;
};
// Position3D represents the next version of the Position type
@mutable
struct Position3D {
    @id(1) int32 x;
    @id(3) int32 z; // z was added in the middle
    @id(2) int32 y;
};
```

Position2D wire format is shown in FIG. 4A and Position3D wire format is shown in FIG. 4B.

Existing Data Sample Manipulation Approaches

There are two ways in which a DDS implementation can manipulate and work with data samples:

Functional data sample manipulation

TypeDescription-Driven Interpreted data sample manipulation

Functional Data Sample Manipulation

A Code Generator application takes the type definition (e.g., IDL definition) as an input, and it generates a set of type-specific functions in the programming language of the DDS implementation. There are N functions per (type, language) pair where N is the number of operations (e.g. marshal, unmarshal) that can be done on data samples for the type. The set of functions generated to manipulate samples of a type are called TypePlugin functions. The process of functional data sample manipulation is shown in FIG. 5. For example, consider the Position IDL type and the target C programming language:

```
struct Position {
    int32 x;
    int32 y;
};
```

Among other functions, when the Code Generator runs, it will generate the functions to marshal (serialize) and unmarshal (deserialize) a data sample with type Position:

```
void PositionPlugin_serialize(const Position *sample,
Buffer *buffer)
{
Buffer_serializeLong(buffer, &sample->x);
Buffer_serializeLong(buffer, &sample->y);
}
void PositionPlugin_deserialize(Position *sample, Buffer *buffer)
{
Buffer_deserializeLong(buffer, &sample->x);
Buffer_deserializeLong(buffer, &sample->y);
}
```

The main advantage of doing Functional data sample manipulation is performance. The time required to manipulate data samples is minimized because the generated functions are tailored to the specific types for which they are generated.

There are two disadvantages:

The amount of generated code can be large because the Code Generator will generate different functions per type.

Maintainability. When there are multiple target programming languages, the Code Generator must support function generation in each one of the languages. This requires different implementations of the code generation process, one per language.

TypeDescription-Driven Interpreted Data Sample Manipulation

With this approach, there are no type-specific functions. Instead, general functions receive as a parameter a description of the type generated by a Code Generator application or built at run-time programmatically. These general functions are called interpreter functions, and there is one per operation on data samples. The process of TypeDescription-Driven Interpreted data sample manipulation is shown in FIG. 6.

For example:

```
void GeneralPlugin_serialize(const Position *sample, const
TypeDescripton * typeDescription, Buffer *buffer)
{
void *memberOffset;
for (i=0; i<typeDescription->memberCount; i++) {
    memberOffset =
    TypeDescripton_getMemberOffset(typeDescription, i);
    if (typeDescription->member[i].type == LONG_TYPE) {
        Buffer_serializeLong(buffer, memberOffset);
    } else {
    /* Other types */
    }
}
}
void GeneralPlugin_deserialize(Position *sample, const
TypeDescripton * typeDescription, Buffer *buffer)
{
void *memberOffset;
for (i=0; i<typeDescription->memberCount; i++) {
    memberOffset = TypeDescripton_getMemberOffset(typeDescription,
    i);
    if (typeDescription->member[i].type == LONG_TYPE) {
```

-continued

```
    Buffer_deserializeLong(buffer, memberOffset);
} else {
    /* Other types */
}
}
}
```

There are two main advantages of doing TypeDescription-Driven Interpreted data sample manipulation:
Code size reduction, because there is no need to generate operations per type. Instead, generates a single TypeDescription.
Better maintainability, because there is no need for the Code Generator to generate operations in every language for a given type.

The main disadvantage of using this approach is performance, because the general interpreter functions do not have a priori knowledge of a type and cannot be specialized for each type.

The present invention addresses these disadvantages and provides technology to manipulate data samples of a topic type that does not have the maintainability and size issues of the "Functional Data Sample Manipulation" approach and it does not have the performance issues introduced by the "TypeDescription-Driven Interpreted Data Sample Manipulation" approach.

SUMMARY OF THE INVENTION

Definitions

Recipes: A recipe contains a list of instructions that indicate how to perform an operation on a data sample (e.g. serialize the sample). An instruction operates on a member or a set of members in a data sample. The instruction includes an opcode and a set of parameters. A parameter can refer to a recipe if it is a parameter of a complex instruction.

DDS Type (or Type): Defines a common structure for data samples of a DDS Topic. DDS-XTYPES OMG specification describes the DDS Type System. The type of a data sample is normally composed of a list of members. For example:

```
struct Resolution {
    int32 height; /* primitive member */
    int32 width; /* primitive member */
};
struct CameraImage {
    @key int32 cameraId; /* primitive member */
    Resolution resolution; /* complex member */
    sequence<octet> pixels; /* sequence member */
};
```

Structure: A Structured type is a named type composed of a list of members.

Union: A Union type is a named type that contains a discriminator member and a list of value members from which at most one can be active based on the discriminator value.

Alias: An alias type provides an alternative name for a structure or union.

TypeDescription: A description of a Type understandable by a computer program.

Memory representation: Represents how a sample is laid out in memory and it is determined by the language binding.

Language binding: specifies the programming-language mechanisms an application can use to construct and introspect data samples. For a given programming language there can be multiple language bindings.

Network representation (or Wire representation): Represents how a sample is transmitted on the network. In DDS, the serialized network representation of a data sample is called Extended Common Data Representation (CDR), and there are two versions: Extended CDR (encoding version 1) (XCDR1) and Extended CDR (encoding version 2) (XCDR2). The representations are defined in the OMG Extensible and Dynamic Topic Types for DDS (DDS-XTYPES) specification.

End of Definitions

This invention is a method and system for manipulating data samples to perform bidirectional conversion between a memory representation and a network representation of data samples associated with a DDS type in a system using the OMG Data Distribution Service (DDS) and the Real-Time Publish Subscribe (RTPS) protocol. The process of bidirectional conversion between a memory and a network representation is shown in FIG. 1.

The method to convert between a memory representation and a network representation is based on the generation of recipes using a TypeDescription of data samples and information specific to the language binding that describes how a data sample is represented in memory (TypeOffsets). Recipes are generated once, at run-time or by a Code Generation application, and they are executed for every data sample. The process of recipe generation and recipe execution for bidirectional conversion between a memory and a network representation is shown in FIG. 2.

The method can be further embodied, access of a data sample in a memory representation is independent of a target language binding by the following mechanisms:
A TypeOffset integer for a target language binding is generated per type member to locate the member value for a data sample.
A TypeOffset is generated at run-time or by a Code Generation application.
A SampleAccessor is generated per Type 'T' to provide an interface that allows accessing and setting a member value with Type 'T'.
A SampleAccessor is used instead of the TypeOffset to access a member value when the memory representation of a data sample member value is different than the network representation of the member value.

The method can be further embodied by a generated recipe containing a set of instructions independent of the target language binding that indicate how to perform an operation on a data sample, for example by the following mechanisms:
The instructions can be primitive, string, complex, and header instructions.
Different kinds of recipes can be generated for the operations on a data sample such as: serialize, deserialize, serialize_key, deserialize_key, skip, serialized_sample_ to_key, get_serialized_size, get_max_serialized_size, and get_min_serialized_size.
Recipes for a Type can be generated at run-time or by a Code Generation application.
A recipe is generated using the TypeDescription, the RecipeKind, the TypeOffset for the Type members, and the RecipeProperties as input parameters The method can be further embodied by multiple versions of a recipe can be generated for the same Type using different RecipeProperties to work with different network representations coexisting in the DDS system, for example by the following mechanisms:

Multiple versions of a recipe can be generated for the same Type using different endianness for the network representation.

Multiple versions of a recipe can be generated for the same Type using XCDR1 and XCDR2 network representations.

The method can be further embodied by a recipe generated with different optimizations levels to reduce the execution time and improve communication latency, for example by the following mechanisms:

A recipe can be generated with no optimization when there is a one-to-one mapping between a member in a type and a recipe instruction.

A recipe can be generated with an optimization level that removes aliases from the Type.

A recipe can be generated with the highest optimization level by (A) replacing the data sample Type with another equivalent Type in which a nested Type 'N' is flattened out when (i) 'N' does not inherit from another type, and (ii) 'N' is marked as @final, or @appendable when the network representation is XCDR1, and (iii) if 'N' is marked as @appendable the recipe kind cannot be deserialize or serialized_sample_to_key, and (iv) none of the members of 'N' are marked with the @default, @min, @max, or @range DDS annotations, and (v) none of the members of 'N' are marked with the @optional or @external DDS annotations, and (vi) 'N' contains only primitive members, or complex members composed only of primitive members, and (vii) the memory representation of the members in 'N' is equal to the network representation, and (viii) there is no padding between the member values in 'N' (in memory and network representations), and (ix) there is no padding between the member values in an array of 'N' (in memory and network representations), and (B) by generating a single instruction to process two or more consecutive primitive members when (i) The network representation of the members is equal to the memory representation, and (ii) there is no padding between the member values (in memory and network representations), and (iii) none of the members of are marked with the @default, @min, @max, or @range DDS annotations, and (v) none of the members of are marked with the @optional or @external DDS annotations, and (C) by removing unnecessary alignment operations between two primitive members if the first member alignment is greater than the second member alignment.

The method can be further embodied by a recipe for a mutable Type containing a member index that reduces the amount of time required to find the instruction that will process a member value in the network representation of a data sample, for example by the following mechanisms:

Where the member index maps a member ID to an instruction index.

Where the member index can be implemented using a variety of data structures, including hash tables, B-Trees, and ordered lists of member IDs.

The method can be further embodied by a recipe for a union Type containing a discriminator index that reduces that amount of time required to find the instruction that will process the value of the active member in the network representation of a data sample, for example by the following mechanisms:

Where the discriminator index can be implemented using a variety of data structures, including hash tables, B-Trees, and ordered lists of member IDs.

The method can be further embodied by executing the recipes generated by the second method on a data sample in which a serialization recipe is executed by:

For union Types: Executing the instruction that deserializes the discriminator value and selecting the active member instruction based on the discriminator value. The selection of the active member instruction is done by using the discriminator index.

For other Types: Iterating over all the instructions.

The method can be further embodied where a deserialization recipe is executed by:

For union Types: Executing the instruction that deserializes the discriminator value and selecting the active member instruction based on the discriminator value. The selection of the active member instruction is done by using the discriminator index.

For mutable Types: In a loop executing the instruction that deserializes the next member ID and selecting the member value instruction based on the member ID. The selection of the member value instruction is done by using the member ID index.

For other Types: Iterating and executing each one of the instructions.

The method can be further embodied where the get_max_serialized_size and get_min_serialized_size recipes are executed a single time after the recipe generation method is applied because they do not operate on the data sample but on the data Type.

The invention can also be described as a method for manipulating data samples associated with a DDS type in a system using an Object Management Group (OMG) Data Distribution Service (DDS) and a Real-Time Publish Subscribe (RTPS) protocol, the method steps including:

(a) having a memory representation of the data samples;

(b) having a network representation of the data samples;

(c) generating one or more conversion recipes using a type description and a language binding information that transforms any data sample associated with the type description (i) from the memory representation to the network representation, (ii) from the network representation to the memory representation, or (iii) a combination of (i) and (ii), wherein the one or more conversion recipes are generated only once; and (d) execution of the generated one or more conversion recipes on all data samples.

Embodiments of this invention can be in the form of a method, system, computer-implemented method executable by computer hardware, computer code where methods steps are executable by a computer processor, distributed over the Internet where the system or method steps are executed by a computer server, or the like.

The embodiments of this invention provide a method or system to manipulate data samples of a topic type and convert between a memory and a network representation for a data sample that is more performant, maintainable, and has a smaller source code footprint than the existing approaches.

BRIEF DESCRIPTION OF THE DRAWINGS

FIG. 10 shows a Sample Accessor Class Diagram according to an exemplary embodiment of the invention.

FIG. 11 shows a UserTyePlugin Class Diagram according to an exemplary embodiment of the invention.

FIG. 14 shows a memory representation sizes for primitive types in the C language binding and compares them with the XCDR network representation sizes according to an exemplary embodiment of the invention.

FIG. 15 shows a memory representation alignments for primitive types in the C language binding and compares them with the XCDR network representation alignments according to an exemplary embodiment of the invention.

DETAILED DESCRIPTION

Recipe-Driven Interpreted Data Sample Manipulation

To address the performance issues of the TypeDescription-Driven Interpreted data sample manipulation, this invention provides a method for data sample manipulation based on the generation of a set of instructions per operation on data samples called a recipe. The recipes are executed by general purpose functions in the target programming language called recipe execution functions.

The IDL types are preprocessed by a Code Generation application that generates one or more recipes (see Recipe Set) per data sample operation.

Figure 1:
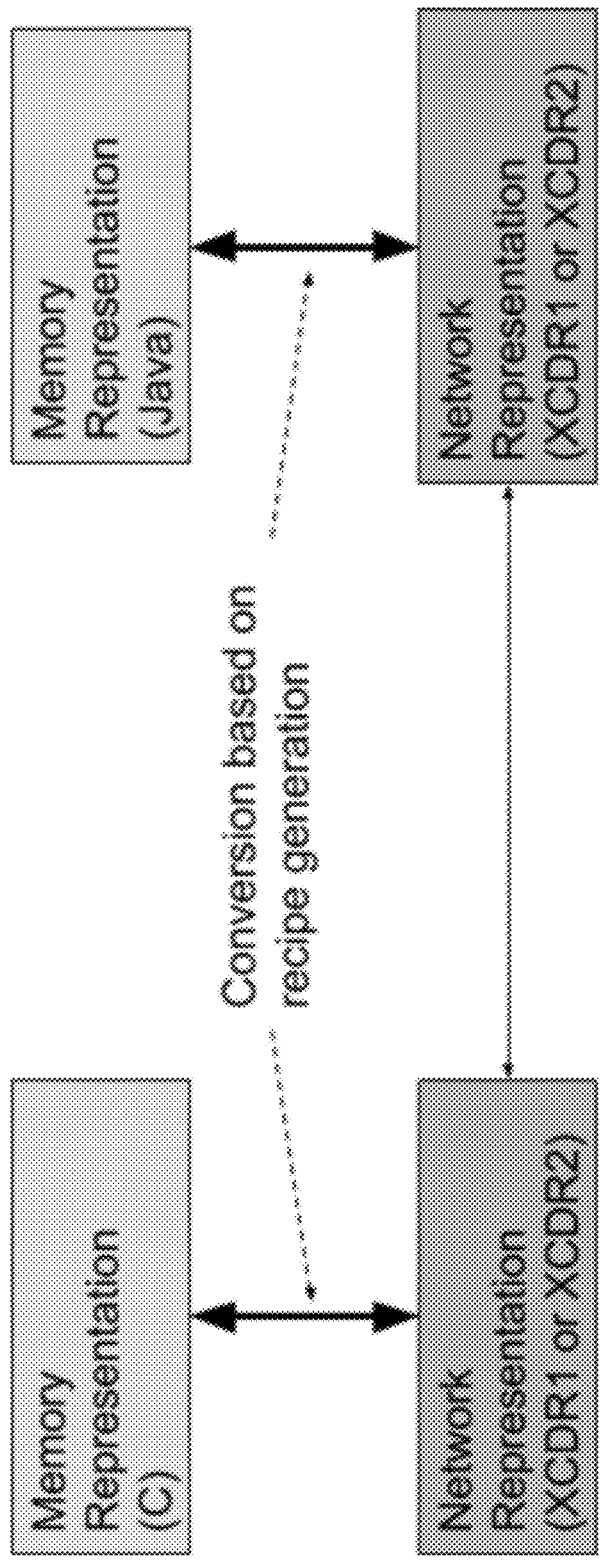
FIG. 1 shows the process of bidirectional conversion between a memory and a network representation according to an exemplary embodiment of the invention.
Figure 2:
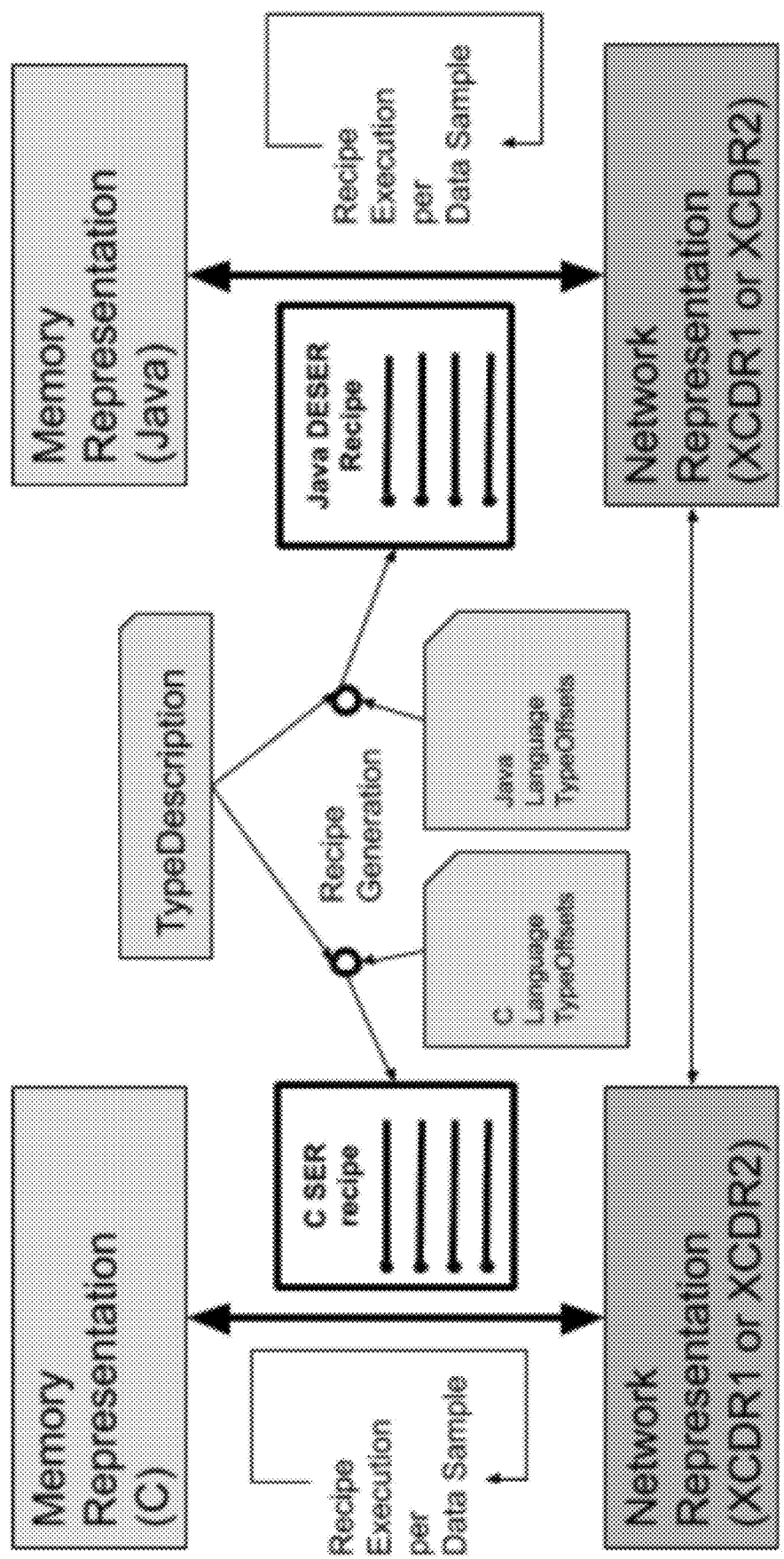
FIG. 2 shows the process of recipe generation and recipe execution for bidirectional conversion between a memory and a network representation according to an exemplary embodiment of the invention.
Figure 3A:
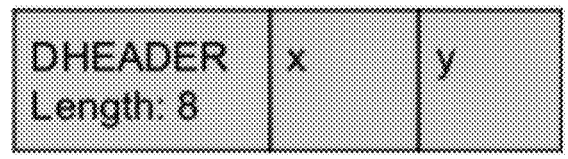
FIG. 3A shows a network representation for an @appendable Position2D including DHEADER according to an exemplary embodiment of the invention.
Figure 3B:
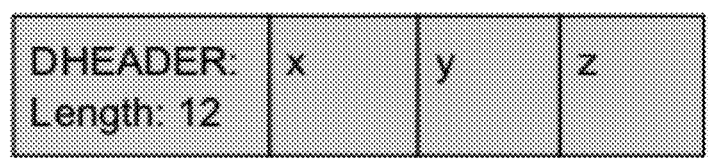
FIG. 3B shows a network representation for an @appendable Position3D including DHEADER according to an exemplary embodiment of the invention.
Figure 4A:
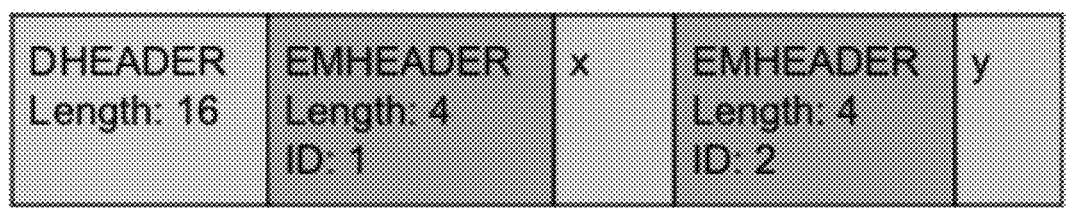
FIG. 4A shows a network representation for a @mutable Position2D including EMHEADER per member according to an exemplary embodiment of the invention.
Figure 4B:
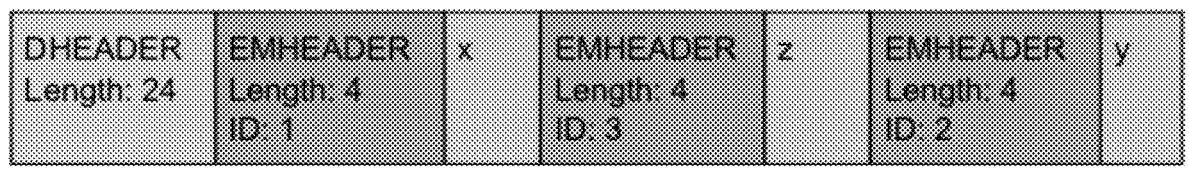
FIG. 4B shows a network representation for a @mutable Position3D including EMHEADER per member according to an exemplary embodiment of the invention.
Figure 5:
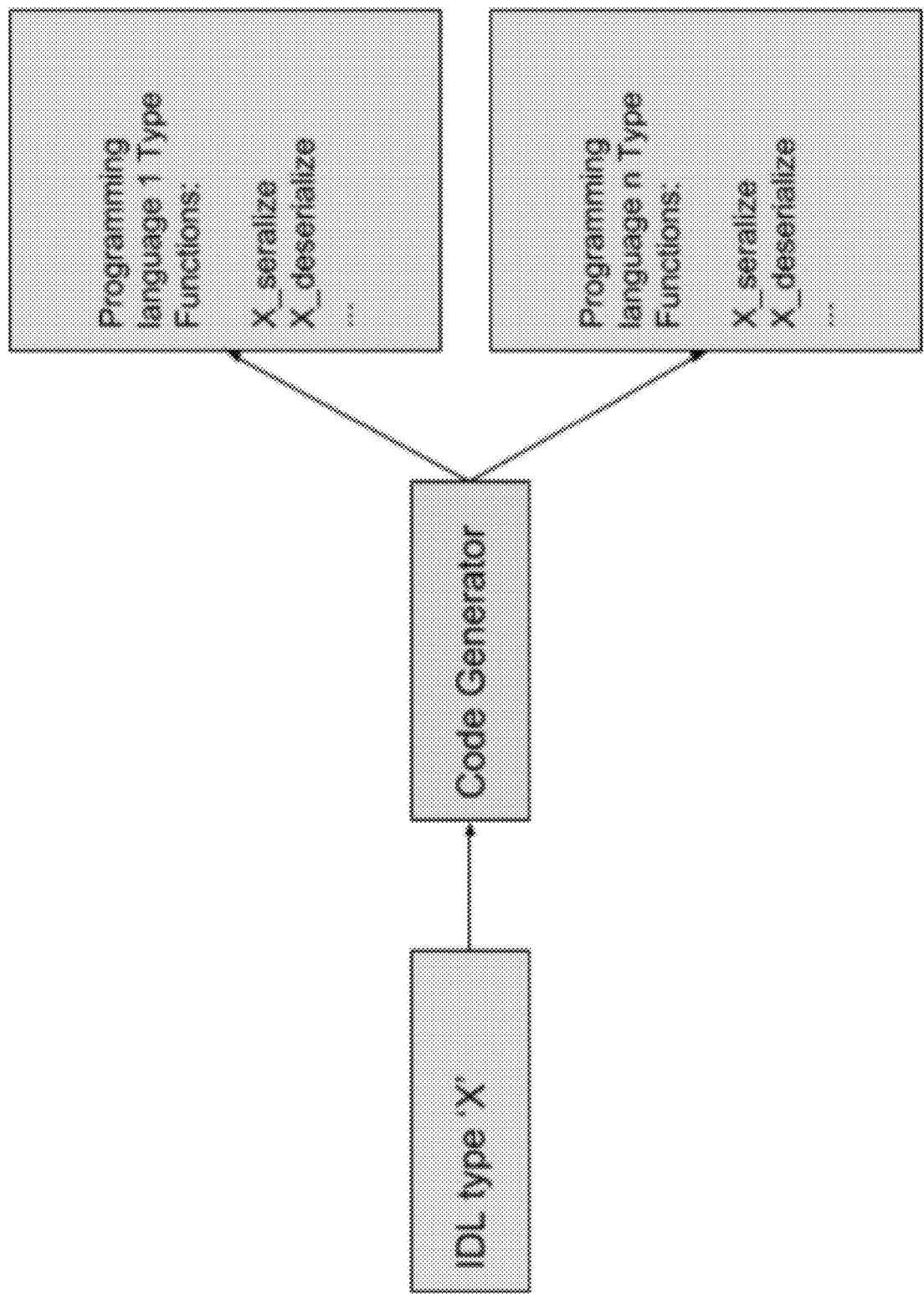
FIG. 5 shows Functional Data Sample Manipulation according to an exemplary embodiment of the invention.
Figure 6:
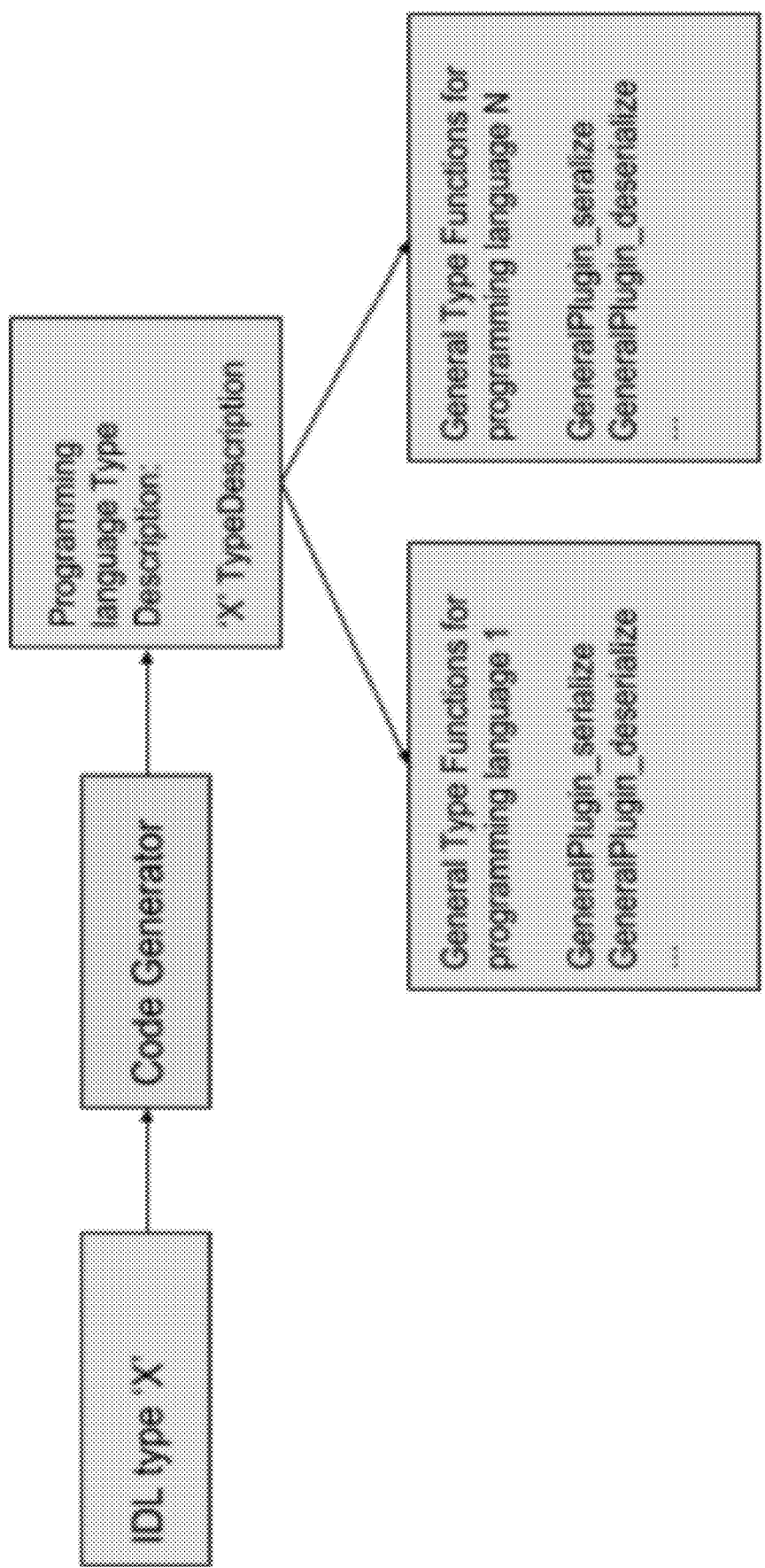
FIG. 6 shows TypeDescription-Driven Interpreted Data Sample Manipulation according to an exemplary embodiment of the invention.
Figure 7:
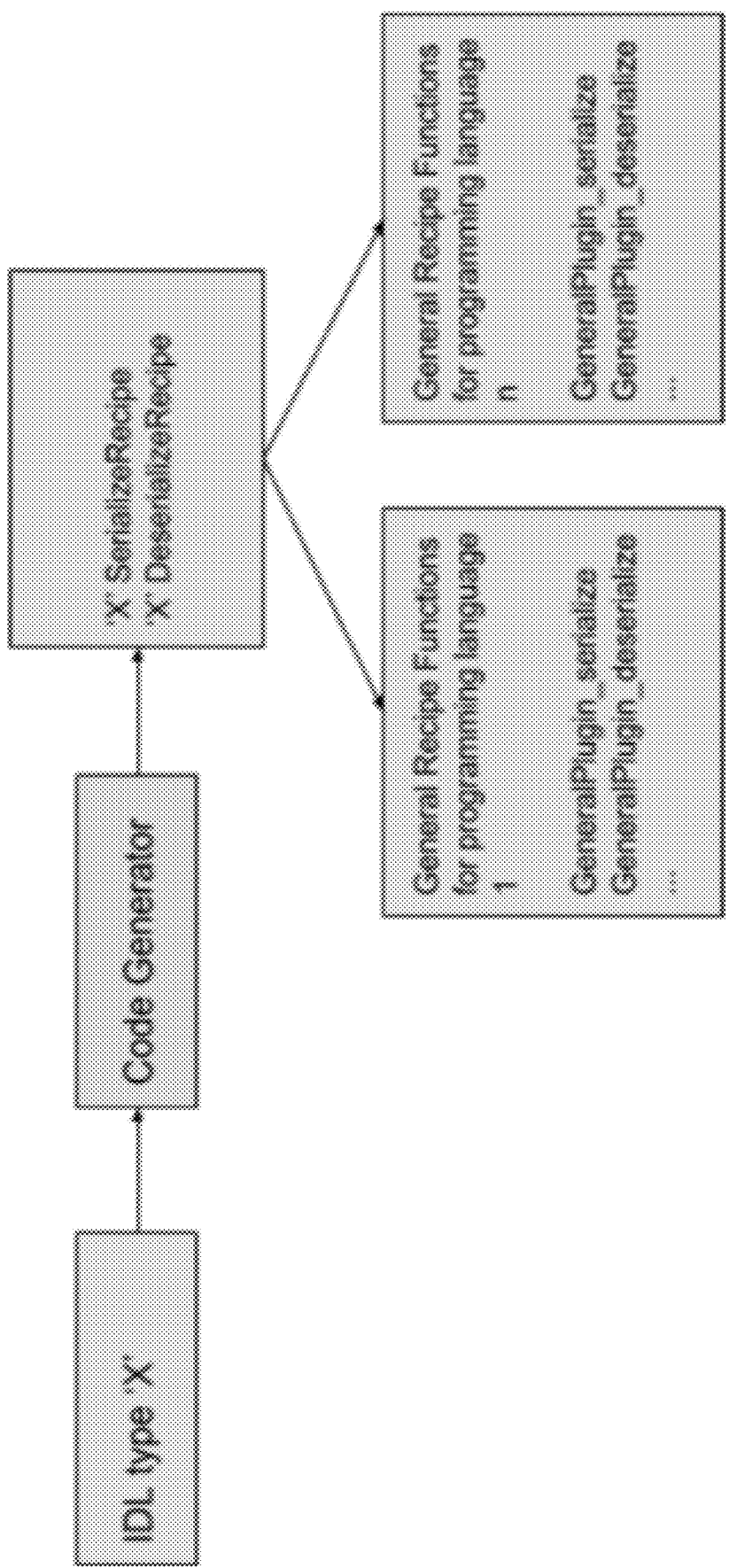
FIG. 7 shows Recipe-Driven Interpreted Data Sample Manipulation according to an exemplary embodiment of the invention.

The process of recipe-driven data sample manipulation is shown in FIG. 7.

For example:

```
void GeneralPlugin_serialize(const Position *sample, const Recipe
*recipe, Buffer * buffer)
{
for (i=0; i<recipe->instructionCount; i++) {
    /* Run next recipe instruction */
}
}
void GeneralPlugin_deserialize(Position *sample, const Recipe
*recipe, Buffer * buffer)
{
for (i=0; i<recipe->instructionCount; i++) {
    /* Run next recipe instruction */
}
}
```

The generation of recipes after preprocessing the IDL type allows applying multiple performance optimizations that in many cases will make the data sample operations run faster than with a Functional data sample manipulation approach (see Functional Data Sample Manipulation).

In addition, there is no need to generate per-type functions, keeping the code size small.

Recipe Functions

The Recipe-Driven Interpreter includes the following recipe execution functions:

GeneralPlugin_serialize: This recipe function executes recipes that convert the memory representation (for example, a C structure) of a data sample to the network format (Extended CDR format).

GeneralPlugin_deserialize: This recipe function executes recipes that convert the network representation of a data sample into the memory representation.

GeneralPlugin_serialize_key: This recipe function executes recipes that convert the memory representation (for example, a C structure) of a data sample key to the network format (Extended CDR format).

GeneralPlugin_deserialize_key: This recipe function executes recipes that convert the network representation of a data sample key into the memory representation.

GeneralPlugin_skip: This recipe function executes recipes that skip or ignore the network representation of a nested data sample.

GeneralPlugin_serialized_sample_to_key: This recipe function executes recipes that convert the network representation of a data sample into the memory representation, but only considers the key fields. It ignores the non-key fields.

GeneralPlugin_get_serialized_size: This recipe function executes recipes that get the size in bytes of the network representation of a data sample.

GeneralPlugin_get_max_serialized_size: This recipe function executes recipes that get the maximum size in bytes of the network representation of the data samples for a type.

GeneralPlugin_get_min_serialized_size: This recipe function executes recipes that get the minimum size in bytes of the network representation of the data samples for a type.

Recipe

Figure 8:
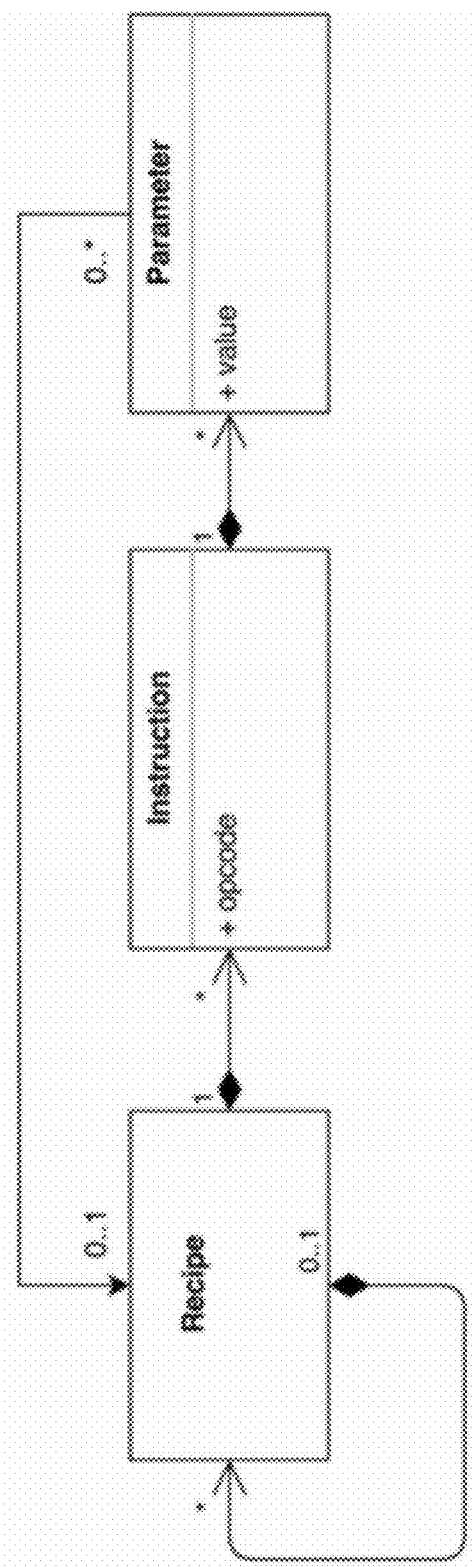
FIG. 8 shows a Recipe Class Diagram according to an exemplary embodiment of the invention.

A recipe contains a list of instructions that indicate how to perform an operation on a data sample (e.g., serialize the sample) (FIG. 8). An instruction operates on a member or a set of members in a data sample. The instruction includes an opcode and a set of parameters. A parameter can refer to a recipe if it is a parameter of a complex instruction (FIG. 8).

Instructions

There are four kinds of instructions:

Primitive instructions: These operate on primitive members.

String instructions: These operate on string members.

Complex instructions: These operate on aliases, enumerations, bitmasks, and aggregated members.

Header instructions: These operate on the headers included as part of the Extended CDR network representation of a data sample.

The following type declaration shows the different member types in a structure called "MyStruct":

```
struct MyNestedStruct {
int32 nested_m1;
};
struct MyStruct {
int32 m1; // Primitive member
string m2; // String member
MyNestedStruct m3; // Complex member
};
```

Primitive Instructions

The primitive instructions are these:

SER_PRIMITIVE: Serializes one or more consecutive primitive values with the same type.

SER_PRIMITIVE_SEQ: Serializes a sequence of primitive values.

DESER_PRIMITIVE: Deserializes one or more consecutive primitive values with the same type.

DESER_PRIMITIVE_SEQ: Deserializes a sequence of primitive values.

SKIP_PRIMITIVE: Skips one or more consecutive primitive values with the same type.

SKIP_PRIMITIVE_SEQ: Skips a sequence of primitive values.

RETURN_PRIMITIVE: Returns a single primitive value.

The parameters of a primitive instruction are these:

Offset: The offset of the first primitive value in the memory representation of the data sample (see Accessing a Data Sample Value in Memory Representation).

SampleAccessor: The sample accessor for the primitive type if the memory representation does not match the wire representation (see Accessing a Data Sample Value in Memory Representation).

Count: The number of primitive values that will be processed by the instruction.

RefMemberKind: Indicates if a member to which the instruction applies is optional and/or external. Possible values are: OPTIONAL_MEMBER, VALUE_MEMBER, EXTERNAL_MEMBER, OPTIONAL AND EXTERNAL_MEMBER.

PrimitiveSize: The size of a single primitive value.

PrimitiveAlignment: The required alignment of the first primitive value.

ByteCount: The number of bytes that will be processed by the instruction. This number is equal to (Count*PrimitiveSize).

Kind: The kind of the primitive values processed by the instruction (e.g, Int16, UInt16, Int32).

MustAlign: Indicates if the first primitive value must be aligned to its type alignment. For example, if the value type is Int32 and this parameter is set to true, the first primitive value must be aligned to 4 in the network representation buffer.

CheckRange: Indicates if range checking is enabled.

Range[min,max]: The range of the primitive values. When CheckRange is set to true, the primitive values must be within [min,max].

String Instructions

The string instructions are these:

SER_STRING: Serializes one or more consecutive string values.

SER_STRING_SEQ: Serializes a sequence of string values.

DESER_STRING: Deserializes one or more consecutive string values.

DESER_STRING_SEQ: Deserializes a sequence of string values.

SKIP_STRING: Skips one or more consecutive string values.

SKIP_STRING_SEQ: Skips a sequence of string values.

SER_WSTRING: Serializes one or more consecutive wide character string values.

SER_WSTRING_SEQ: Serializes a sequence of wide character string values.

DESER_WSTRING: Deserializes one or more consecutive wide character string values.

DESER_WSTRING_SEQ: Deserializes a sequence of wide character string values.

SKIP_WSTRING: Skips one or more consecutive wide character string values.

SKIP_WSTRING_SEQ: Skips a sequence of wide character string values.

The parameters of a string instruction are these:

Offset: The offset of the first string value in the memory representation of the data sample (see Accessing a Data Sample Value in Memory Representation).

SampleAccessor: The sample accessor for the string type if the memory representation does not match the wire representation (see Accessing a Data Sample Value in Memory Representation).

Count: The number of consecutive string values that will be processed by the instruction.

RefMemberKind: Indicates if a member to which the instruction applies is optional and/or external. Possible values are: OPTIONAL_MEMBER, VALUE_MEMBER, EXTERNAL_MEMBER, OPTIONAL AND EXTERNAL_MEMBER.

CharMaxCount: The maximum size in number of characters of a string value.

CharAlignment: The required alignment of a character.

CharSize: The size of a character. For string types, this value is always one. For wide string types this value can be 2 or 4 depending on the wire encapsulation format.

Complex Instructions

The complex instructions are these:

SER_COMPLEX: Serializes one or more consecutive complex values.
SER_COMPLEX_SEQ: Serializes a sequence of complex values.
DESER_COMPLEX: Deserializes one or more consecutive complex values.
DESER_COMPLEX_SEQ: Deserializes a sequence of complex values.
SKIP_COMPLEX: Skips one or more consecutive complex values.
SKIP_COMPLEX_SEQ: Skips a sequence of complex values.

The parameters of a complex instruction are these:

Offset: The offset of the first complex value in the memory representation of the data sample (see Accessing a Data Sample Value in Memory Representation).
Count: The number of consecutive complex values that will be processed by the instruction.
RefMemberKind: Indicates if a member to which the instruction applies is optional and/or external. Possible values are: OPTIONAL_MEMBER, VALUE_MEMBER, EXTERNAL_MEMBER, OPTIONAL AND EXTERNAL_MEMBER.
BaseClass: Indicates if the complex type has a base class.
Recipe: The recipe that is needed to manipulate the complex value.
UserTypePlugin: A set of callbacks to functions that can be updated by the user to customize the data manipulation process for the complex value(s) (see Customizing TypePlugin Functions).

Header Instructions

The header instructions are these:

SER_DHEADER: Serializes a DHEADER in an appendable or mutable aggregated type.
DESER_DHEADER: Deserializes a DHEADER in an appendable or mutable aggregated type.
SKIP_DHEADER: Skips a DHEADER and the content of the sample to which it applies in an appendable or mutable aggregated type.
SER_MEMBER_HEADER: Serializes an EMHEADER in a mutable type.
DESER_MEMBER_HEADER: Deserializes an EMHEADER in a mutable type.
SKIP_MEMBER_HEADER: Skips an EMHEADER and the content of the member to which it applies in a mutable type.
SER_SENTINEL_HEADER: Serializes a SENTINEL header for Extended CDR (encoding version 1).
SKIP_SENTINEL_HEADER: Skips a SENTINEL header for Extended CDR (encoding version 1).

The parameters of a complex instruction are these:

MemberId: This applies to EMHEADER instructions and represent the ID of the member to which the header applies.

Accessing a Data Sample Value in Memory Representation

The manipulation of data samples requires accessing their member values in the memory representation. This is done by using the type offsets. A type offset is a 64-bit integer that points to a memory address in the application memory space relative to the start memory address of the data sample (FIG. 9).

Figure 9:
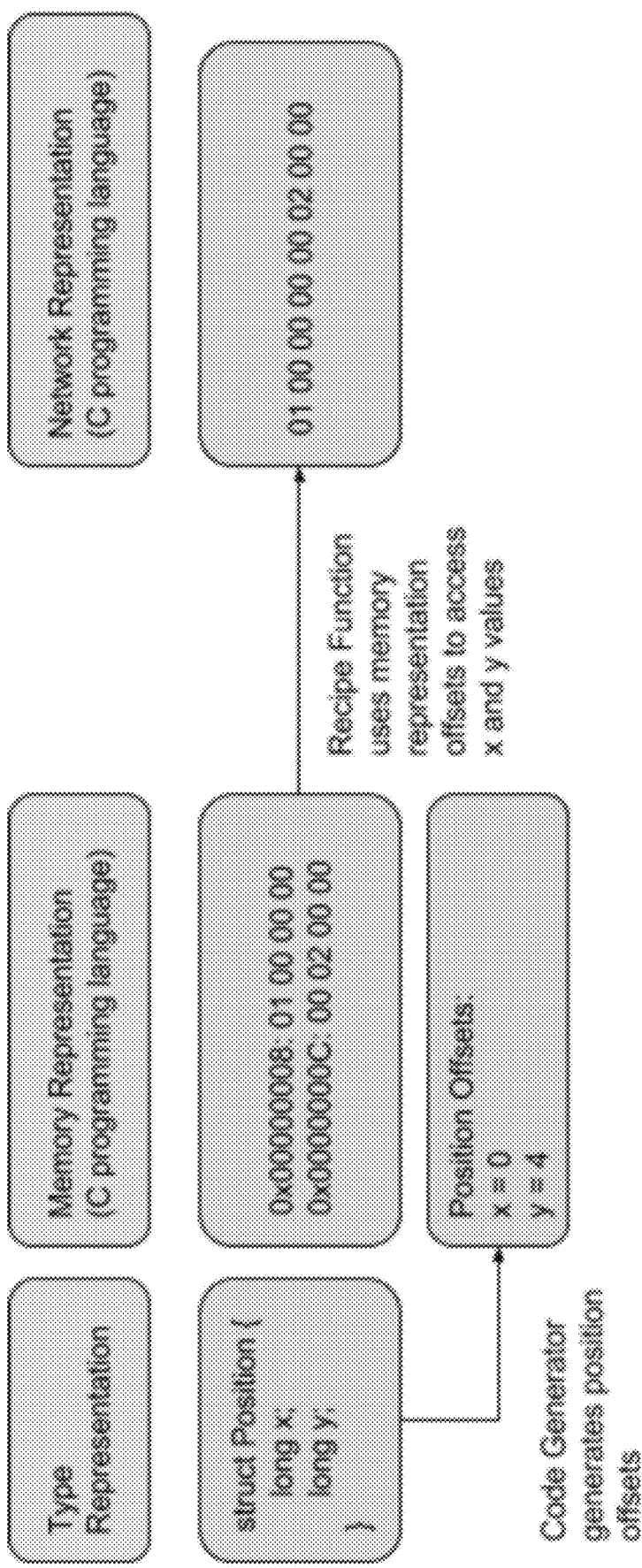
FIG. 9 shows how Type Offsets are generated and how a recipe uses Type Offsets to access a data sample value in the memory representation according to an exemplary embodiment of the invention.

Recipe functions use type offsets to locate member values for data samples (FIG. 9). The offset values are language binding dependent. They can be calculated at run-time or by a Code Generation application.

For example, for the type Position below and the C programming language, the offset for "x" is 0 and for "y" is 4.

```
struct Position {
    int32 x;
    int32 y;
};
```

If the memory representation of a data sample member value (e.g. "x" for Position) is equal to the network representation, the recipe functions can directly access the member value at the memory address (sample address+member value offset). However, in some cases, for some programming languages, the memory representation of a member value may be different (in size and/or format) than the network representation.

For example, the memory representation for the "x" member in the Position type in a programming language could be an 8-byte integer, while the network representation is a 4-byte integer. In this case, the recipe function cannot directly access the member value at the memory address (sample address+x offset), and it must obtain this value by using a sample accessor.

Sample accessors are set per member, and they implement an interface (FIG. 10) that allows accessing/setting a data sample member value in the memory representation.

Sample accessors allow keeping the implementation of the recipe functions (e.g, GeneralPlugin_serialize) generic and independent of the programming language. If the memory representation for a sample member in a target language is different than the wire representation, the Code Generator application must generate sample accessors for the member. These sample accessors, in combination with the member offset, will allow getting the member value when serializing and allow setting the member value when deserializing.

Customizing TypePlugin Functions

In some cases, the user may want to intercept the processing of a data sample member while running a recipe for the data sample. For example, let's assume the type Position below:

```
struct Position {
    int32 x;
    int32 y;
}
```

When the recipe function GeneralPlugin_serialize is run to serialize a data sample, the user may want to report an error if the current Position is outside a given area. To allow doing this, the instructions that process a complex member (e.g., SER_COMPLEX) receive an optional parameter called UserTypePlugin. The UserTypePlugin defines an API (FIG. 11) that contains the hooks to insert user behavior during the recipe execution process.

Before the SER_COMPLEX instruction for a Position object is executed, GeneralPlugin_serialize will invoke the UserTypePlugin function serialize to customize the serialization behavior.

For each input type, the Code Generator application generates skeletons for the UserTypePlugin API for the type. By default, these skeletons have an empty implementation.

Recipe Generation

Figure 12:
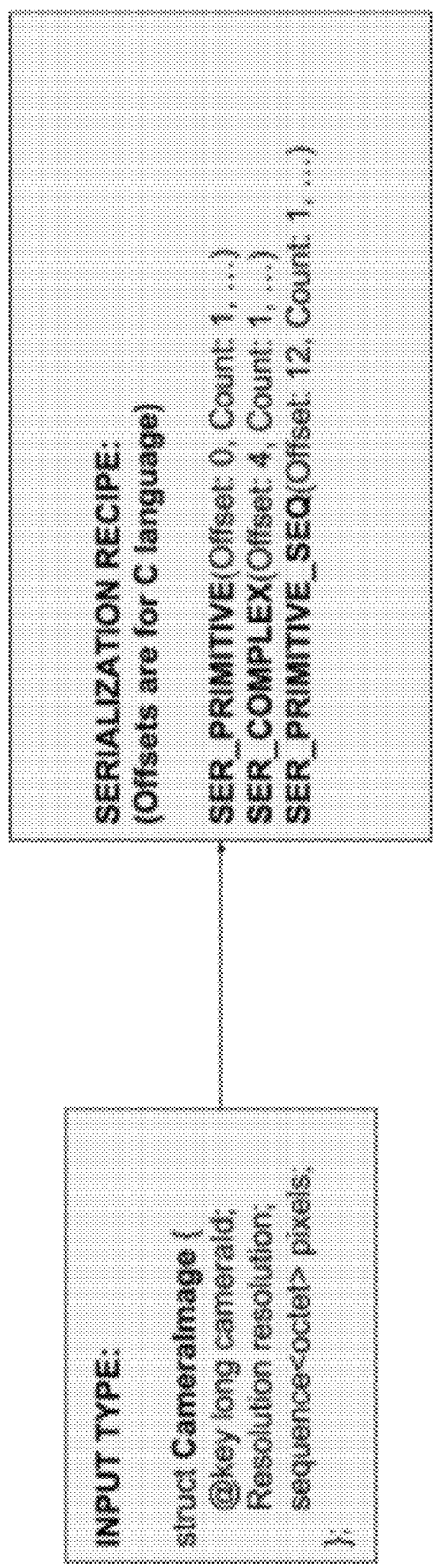
FIG. 12 shows Recipe Generation for a CameraImage according to an exemplary embodiment of the invention.

Recipe generation is the process of taking a type and generating a set of recipes to manipulate the data samples for the type. For example, the serialization recipe for a camera image is as shown in FIG. 12.

Data sample manipulation recipes can be generated at code generation time or at run-time when a type is registered with a DDS application.

The recipes for a given type are just data. The execution of a recipe is done by a recipe function (see Recipe Functions). For example, the Recipe type in the C programming language is defined as follows:

```
typedef struct Recipe {
    RecipeKind kind;
    struct TypeDescription *typeDescription;
    unsigned long instructionCount:
    Instruction *instructions;
    /* More fields may go here */
} Recipe;
```

Figure 13:
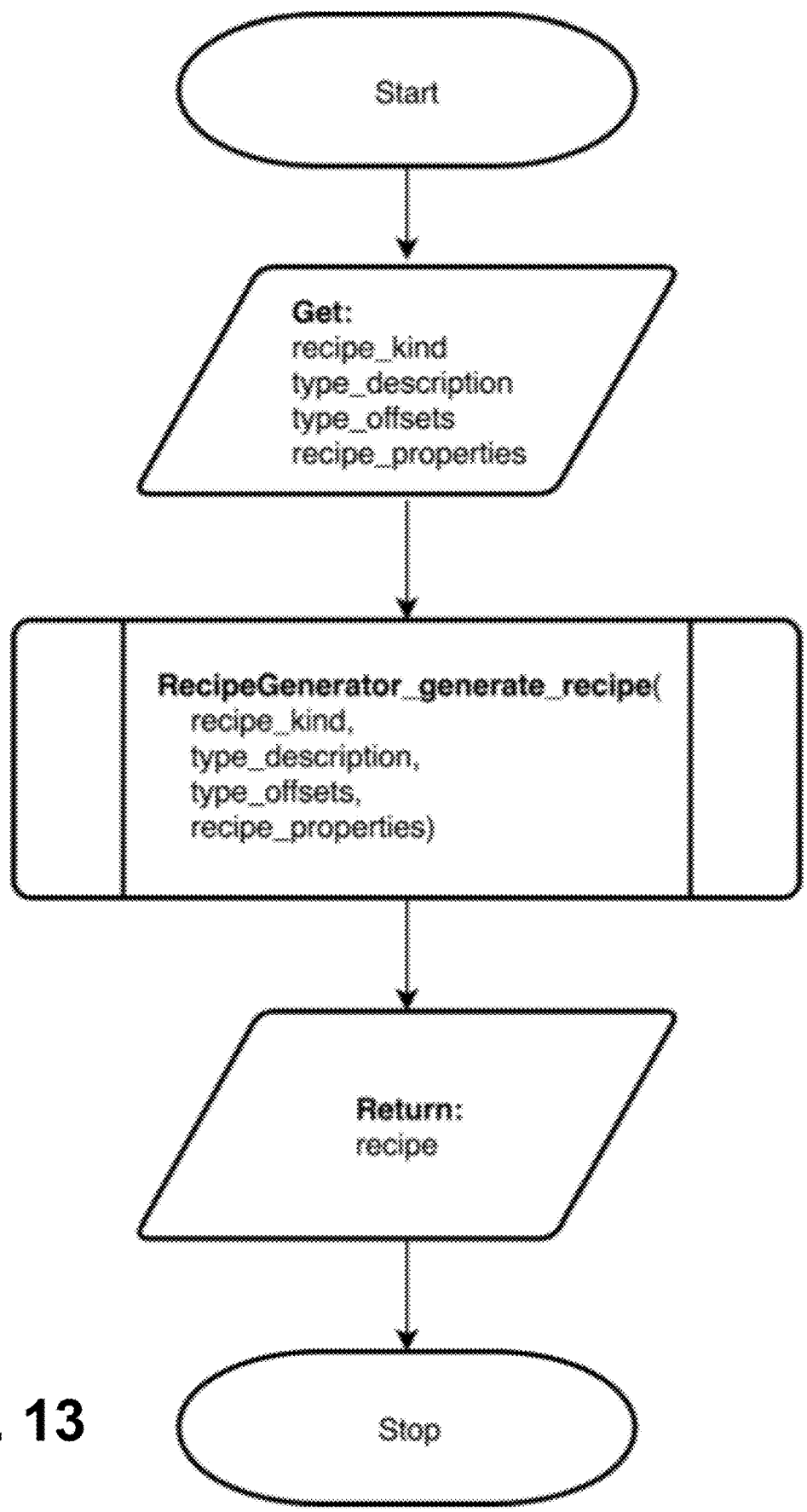
FIG. 13 shows a high-level flowchart of the recipe generation algorithm according to an exemplary embodiment of the invention.

The recipe generation algorithm (RecipeGenerator_generate_recipe), as shown in FIG. 13, generates a recipe for an input Type. The algorithm receives four parameters:

RecipeKind: Indicates what kind of recipe has to be generated. These are the possible values:

```
enum RecipeKind {
    SER_RECIPE,
    DESER_RECIPE,
    SKIP_RECIPE,
    GET_SER_SIZE_RECIPE,
    GET_MAX_SER_SIZE_RECIPE,
    GET_MIN_SER_SIZE_RECIPE,
    SER_TO_KEY_RECIPE
};
```

TypeDescription: The TypeDescription associated with the input type. When the recipe is generated at run-time, the TypeDescription is provided as a TypeObject. If the recipe is generated by the Code Generator application, the TypeDescription is the IDL or XML representation of the type.

TypeOffsets: The type offsets that allow accessing a data sample value in memory representation. These offsets depend on the target DDS programming language (see Accessing a Data Sample Value in Memory Representation).

RecipeProperties: The recipe properties configure several aspects of the recipe generation process. For example, one of the properties specifies the format of the serialized network representation (XCDR1 or XCDR2).

Recipe Generation Properties

The recipe generation properties configure several aspects of the recipe generation process:

Endianness: Configures the endianness of the wire representation and has two possible values: BIG_ENDIAN and LITTLE_ENDIAN. When a data sample member value is transformed from its memory representation to the wire representation, the endianness of the value in memory can be different than the wire endianness. In this case, the execution of the serialization/deserialization instruction for the recipe will have to do a byte swapping when generating wire representation instead of just doing a memory copy operation.

RepresentationId: Configures the format of the wire representation. There are two possible values: XCDR1 and XCDR2.

OnlyKey: Indicates if the recipe must consider only the fields marked with the key annotation @key.

OptimizationLevel: Indicates the optimization level for the recipe. The recipe generation algorithm can make several optimizations that will result in faster serialization/deserialization execution times (see Recipe Optimization Levels).

Recipe Optimization Levels

The cost of serialization and deserialization operations increases with type complexity and sample size, and it can become a significant contributor to the latency required to send and receive a sample.

The OptimizationLevel generation property allows configuring three different levels of optimizations for recipe generation.

Level 0: There is no optimization. There is a one-to-one mapping between a member in a type and a recipe instruction. For example:

```
@final
struct Dimension {
    int32 height;
    int32 width;
};
typedef Dimension Resolution;
@final
struct CameraImage {
    int32 cameraId;
    int32 imageId;
    Resolution resolution;
    sequence<octet> pixels;
};
```

The serialize recipe for CameraImage is as follows:
CameraImage Recipe:
SER_PRIMITIVE(Offset: 0, Count: 1, . . . )
SER_PRIMITIVE(Offset: 4, Count: 1, . . . )
SER_COMPLEX(Offset: 8, Count: 1, . . . ) // Run Recipe for Resolution
SER_PRIMITIVE_SEQ(Offset: 16, Count: 1, . . . )
Resolution Recipe:
SER_COMPLEX(Offset: 0, Count: 1, . . . ) // Run Recipe for Dimension
Dimension Recipe:
SER_PRIMITIVE(Offset: 0, Count: 1, . . . )
SER_PRIMITIVE(Offset: 4, Count: 1, . . . )

Running the recipe for CameraImage will require executing 7 instructions (4 for Camera Image, 1 for Resolution, and 2 for Dimension).

With optimization level 0, the recipe generation's goal is to reduce the cost of generating a recipe and to allow the user to intercept the processing of a data sample to customize the behavior (see Customizing TypePlugin Functions).

Level 1: The recipe generation function optimizes the recipe execution time by resolving typedef (aliases). If a member type is a typedef that can be resolved to a primitive, enum, or aggregated type (struct, union, or value type), the recipe generation function will not generate an instruction for the typedef, but generate the type to which it resolves to. For the previous example, the recipe would be:
CameraImage Recipe:
SER_PRIMITIVE(Offset: 0, Count: 1, . . . )
SER_PRIMITIVE(Offset: 4, Count: 1, . . . )
SER_COMPLEX(Offset: 8, Count: 1, . . . ) // Run Recipe for Dimension
SER_PRIMITIVE_SEQ(Offset: 16, Count: 1, . . . )
Dimension Recipe:
SER_PRIMITIVE(Offset: 0, Count: 1, . . . )

SER_PRIMITIVE(Offset: 4, Count: 1, . . . )

Running the recipe for CameraImage will require executing 6 instructions (4 for Camera Image and 2 for Dimension).

With optimization level 1, the user will not be able to customize behavior for typedef serialization/deserialization since the typedef recipe is not run. However, the user will still be able to customize behavior for CameraImage and Dimension.

Level 2: With this optimization level, the recipe generation function optimizes the generation of recipes for structures and valuetypes by using more aggressive techniques. These techniques include:

Inline expansion of nested types (removal of type boundaries).

Processing of a set of consecutive members with a single instruction when the memory layout (e.g., C, C++ structure layout) is the same as the wire layout (XCDR1 or XCDR2).

Member alignment optimizations

The goal of optimization level 2 is to provide the fastest execution time for a recipe. Depending on the type layout and complexity, the serialization/deserialization can be several times faster than with a traditional Functional data sample manipulation approach (see Functional Data Sample Manipulation).

Inline Expansion of Nested Types

Inline expansion is an optimization in which the recipe generator replaces a type definition with another type definition in which nested types are flattened out. This is done to remove the execution of complex instructions during serialization/deserialization. For example:

```
@final
struct Dimension {
    int32 height;
    int32 width;
};
typedef Dimension Resolution;
@final
struct CameraImage {
    int32 cameraId;
    int32 imageId;
    Resolution resolution;
    sequence<octet> pixels;
};
```

With optimization level 2, the recipe generator replaces the definition of CameraImage with the following equivalent definition:

```
@final
struct CameraImage {
    int32 cameraId;
    int32 imageId;
    int32 resolution_height;
    int32 resolution_witdh;
    sequence<octet> pixels;
};
```

This optimization is only done for recipe generation purposes. The language binding (e.g., C++) mapping of CameraImage is still the same and continues using Resolution.

For the previous example, after applying the optimization the recipe will be:

SER_PRIMITIVE(Offset: 0, Count: 1, . . . )
SER_PRIMITIVE(Offset: 4, Count: 1, . . . )
SER_PRIMITIVE(Offset: 8, Count: 1, . . . )
SER_PRIMITIVE(Offset: 12, Count: 1, . . . )
SER_PRIMITIVE_SEQ(Offset: 16, Count: 1, . . . )

Running the recipe for CameraImage will require executing 5 instructions as opposed to 7 without optimizations.

Processing Multiple Members with a Single Instruction

If the memory layout (e.g. C++ layout) of a set of consecutive primitive members in a data sample matches the network layout considering the data representation (XCDR1 or XCDR2) and the endianness (BIG endian or LITTLE endian) and there is no padding between the different member values (in memory and network), the recipe generator can generate a single instruction to process all the members versus one per member.

In the previous example the first four instructions would be coalesced into a single instruction with a count value of 16 (4 integers), a primitive size of 1, and a primitive alignment of 4:

SER_PRIMITIVE(Offset: 0, Count: 16, PrimitiveSize: 1, PrimitiveAlignment: 4 . . . )
SER_PRIMITIVE_SEQ(Offset: 16, Count: 1, . . . )

When the primitive instructions are coalesced, the resulting instruction considers the primitive type an octet and sets the primitive alignment to the alignment of the primitive type of the first member in the group.

Running the recipe for CameraImage will require executing 2 instructions versus 7 without optimizations.

The combination of both optimizations, first inline expansion and second coalescing of multiple members into a single instruction provides the fastest execution time. However, the user loses the ability customize the data manipulation process as there is no 1-1 correspondence between members and instructions (see Customizing TypePlugin Functions).

Rules for Inline Expansion

There are two fundamental approaches to determine when to apply inline expansion:

1. Apply inline expansion for all complex members (structure, union, valuetype).
2. Apply inline expansion for a complex member only when the memory layout of the member type matches the network layout.

The main disadvantage of the first approach is memory usage, because the recipe for two or more members with the same complex type requires the generation of an independent set of instructions. For example:

```
@final
struct NestedType {
    string m1;
    long m2;
    long m3;
};
@final
struct TopLevelType {
    NestedType m1;
    NestedType m2;
    NestedType m3;
};
```

By applying inline expansion based on rule 1, one would end up with the following type:

```
@final
struct TopLevelType {
    string m1_m1;
```

```
        long m1_m2;
        long m1_m3;
        string m2_m1;
        long m2_m2;
        long m2_m3;
        string m3_m1;
        long m3_m2;
        long m3_m3;
    };
```

The serialization recipe for the type TopLevelType would be:
TopLevelType Recipe.
SER_STRING(Offset: 0, Count: 1, . . . ) SER PRIMITIVE (Offset: 4, Count: 1, . . . )
SER_PRIMITIVE(Offset: 8, Count: 1, . . . )
SER_STRING(Offset: 12, Count: 1, . . . )
SER_PRIMITIVE(Offset: 16, Count: 1, . . . )
SER_PRIMITIVE(Offset: 20, Count: 1, . . . )
SER_STRING(Offset: 24, Count: 1, . . . )
SER_PRIMITIVE(Offset: 28, Count: 1, . . . )
SER_PRIMITIVE(Offset: 32, Count: 1, . . . )

Offsets are based on a C++ memory representation in a 32-bit architecture.

Without inline expansion the serialization recipe for the TopLevelType would be:
NestedType Recipe:
SER_STRING(Offset: 0, Count: 1, . . . )
SER_PRIMITIVE(Offset: 4, Count: 1, . . . )
SER_PRIMITIVE(Offset: 8, Count: 1, . . . )
TopLevelType Recipe:
SER_COMPLEX(Offset: 0, Count: 1, . . . )
SER_COMPLEX(Offset: 12, Count: 1, . . . )
SER_COMPLEX(Offset: 24, Count: 1, . . . )

The recipe contains 6 instructions as opposed to 9 instructions with inline expansion, translating into higher memory usage for the TopLevelType recipe.

If inline expansion was done only for structures in which the memory layout matches the network layout, the instructions for the different members could be coalesced into a single primitive instruction (see Processing Multiple Members with a Single Instruction). This single primitive instruction would not only improve the performance of the recipe execution, it would also reduce the memory usage for the recipe of the top-level type. For example:

```
        @final
        struct NestedType {
        long m1;
        long m2;
        long m3;
        };
        @final
        struct TopLevelType {
        NestedType m1;
        NestedType m2;
        NestedType m3;
        };
```

Because the memory layout for NestedType matches the network layout, NestedType can be expanded, resulting in the following top-level type:

```
        @final
        struct TopLevelType {
        long m1_m1;
        long m1_m2;
        long m1_m3;
        long m2_m1;
        long m2_m2;
        long m2_m3;
        long m3_m1;
        long m3_m2;
        long m3_m3;
        };
```

The processing of all the members in TopLevelType can be done with a single recipe instruction, because memory and network layouts match:
SER_PRIMITIVE(Offset: 0, Count: 36, PrimitiveSize: 1, PrimitiveAlignment: 4 . . . )

We have not only optimized the recipe execution time, we have also reduced the memory consumption by going from 6 instructions before inlining to 1 instruction after inlining and coalescing instructions.

Algorithm for Inline Expansion Based on Memory and Network Layout Match

To see if inline expansion can be applied to a struct/valuetype 'T', it is necessary to determine if the memory layout (e.g., C, C++) for a data sample of type 'T' matches the network layout (XCDR1 or XCDR2). The layouts match when all of the following conditions apply:

1) The network representation endianness is equal to the memory representation endianness.
2) 'T' does not inherit from another type. In the case of C language, this condition could be relaxed.
3) 'T' is marked as @final OR @appendable when the network representation is XCDR1.
4) If 'T' is marked as @appendable, the recipe_kind cannot be DESER_RECIPE or SER_TO_KEY_RECIPE. This condition is necessary because appendable types can evolve by adding new members at the end. If a DataReader subscribing to a topic with type 'T' received a data sample from a DataWriter publishing the same topic with type 'Tsmall', where 'T small' contains fewer members, inlining 'T' and generating a single instruction for all members in 'T' would lead to deserialization errors.
5) None of the members of 'T' are marked with the @default, @min, @max, or @range DDS annotations.
6) None of the members of 'T' are marked with the @optional or @external DDS annotations.
7) 'T' contains only primitive members, or complex members composed only of primitive members. For example:

```
@final
struct Dimension {
int32 height;
int32 width;
}; // Inlinable
@final
struct Dimension {
string label; // Inlinable structures cannot contain strings int32 height;
int32 width;
}; // Not Inlinable
```

8) The size of the primitive types in 'T' is the same for the network and memory layouts. For the C language binding, the sizes are as shown in FIG. 14.

For the C++ language binding, the sizes are also as above except in some platforms where the size of the boolean is different. In this case, the algorithm detects the difference. When the boolean is different, structures containing the booleans are not inlinable.

Other language bindings may require different size tables.
9) With any initial alignment (1, 2, 4, 8) greater than the alignment of the first member of 'T', there is no padding between the members that are part of 'T' in the memory and network layout. To apply this rule for the C and C++ language binding, the algorithm considers these alignments (FIG. 15).

The C size and alignment assumes default packing and alignment. For example:

```
@final
struct Dimension {
int32 height;
int16 width;
}; // Inlinable. Independently of the alignment of the starting memory address (4 or 8),
// there is no padding between long and width
@final
struct Dimension {
int16 height;
int32 width;
}; // Not Inlinable. Starting in a memory address aligned to 4 will require adding a
// padding of two bytes between height and width
```

Other language bindings may require different alignment tables.
10) With any initial alignment (1, 2, 4, 8) greater than the alignment of the first member of 'T', there is no padding between the elements of an array of 'T'. For example:

```
@final
struct Dimension {
int32 height;
int16 width;
}; // Not inlinable. Let's assume an array of two dimensions Dimension[2].
If the array
// starts in a memory address aligned to 4, there would be padding between the first and the // second element of the array
@final
struct Dimension {
int32 height;
int16 width;
int16 padding;
}; // Inlinable
```

For serialization and deserialization purposes, the RecipeGenerator_generate_recipe function will consider an inlinable structure (according to the previous rules) as a primitive array, where the alignment of the primitive type corresponds to the alignment of the first member of the structure. A member with type 'T' will be serialized with a single copy (memcpy) invocation.

Alignment Optimizations

The algorithm to generate recipes (RecipeGenerator_generate_recipe) also tries to save alignment operations when possible. For example:

```
@final
struct Dimension {
int32 height;
int16 width;
};
```

For the previous type, if the endianness of the network and memory layouts is not the same, the recipe generation function cannot apply the optimization in which height and width are processed together with a single instruction. In such a case, the recipe for serialization would be like this:
Dimension Recipe:
SER_PRIMITIVE(Offset: 0, Count: 1, PrimitiveAlignment: 4, . . . )
SER_PRIMITIVE(Offset: 4, Count: 1, PrimitiveAlignment: 2, . . . )

By default, the execution of the SER_PRIMITIVE instruction will try first to align the memory in the network buffer to an address divisible by the PrimitiveAlignment parameter of the SER_PRIMITIVE instruction that is being processed. After that, the execution will "copy" the value from the memory buffer to the network buffer. The copy operation will require byte swapping because the endianness between the network and memory representation is different.

The alignment operation is a costly operation because it requires several arithmetic operations:

```
AlignedBufferAddress = (((CurrentBufferAddress) +
((PrimitiveAlignment) − 1)) & ~((PrimitiveAlignment) − 1))
```

In the previous type, however, RecipeGenerator_generate_recipe knows that the member "width" is already aligned after "height" is processed, because the PrimitiveAlignment "width" is smaller than the primitive alignment for "height". In this case, when the SER_PRIMITIVE for width is generated, the parameter MustAlign is set to FALSE, indicating that alignment is not necessary at execution time:
Dimension Recipe:
SER_PRIMITIVE(Offset: 0, Count: 1, PrimitiveAlignment: 4, MustAlign: TRUE . . . )
SER_PRIMITIVE(Offset: 4, Count: 1, PrimitiveAlignment: 2, MustAlign: FALSE . . . )
Instruction Index
Member ID Indexes Types marked as @mutable can evolve by reordering, adding, or removing members. The next example shows how the type Position evolves by adding a new member "z" to the Position type. This member is not added at the end but in the middle.

```
@mutable
struct Position2D {
@id(1) int32 x;
@id(2) int32 y;
};
// Position3D represents the next version of the Position type
@mutable
struct Position3D {
@id(1) int32 x;
@id(3) int32 z; // z was added in the middle
@id(2) int32 y;
};
```

To allow this kind of evolution, the XCDR network representation serializes each one of the member values (e.g. x, y) by prepending an EMHEADER. This header contains information including the member ID (a unique 32-bit integer identifying the member), and the size of the serialized member value following the header.

Figure 16:
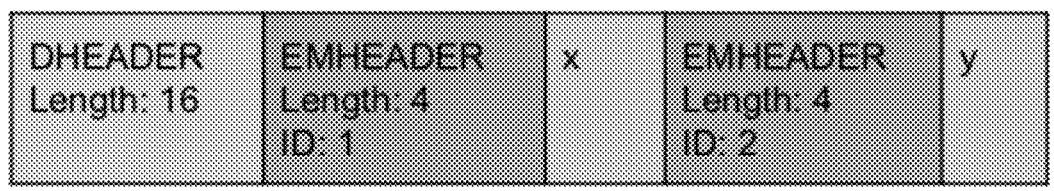
FIG. 16 shows a network representation for an @mutable Position2D including EMHEADER according to an exemplary embodiment of the invention.
Figure 17:
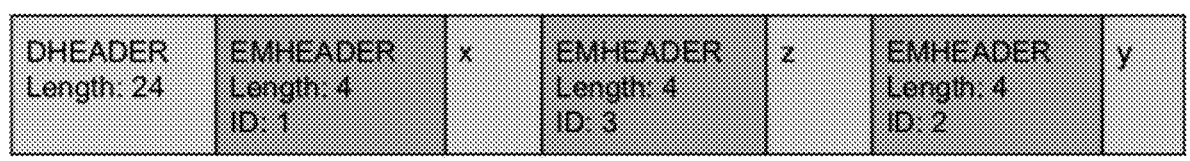
FIG. 17 shows a network representation for an @mutable Position3D including EMHEADER according to an exemplary embodiment of the invention.

The member ID allows locating a member in the network buffer. The size allows moving to the next member. Position2D wire format as shown in FIG. 16. Position3D wire format as shown in FIG. 17.

Assume a DataWriter publishing Position2D and a DataReader subscribing to Position3D.

The serialization recipe for Position2D assuming XCDR2 wire format is:
Position2D Serialization Recipe:
SER_DHEADER( )
SER_MEMBER_HEADER(MemberId: 1, . . . )
SER_PRIMITIVE( )
SER_MEMBER_HEADER(MemberId: 2, . . . )
SER_PRIMITIVE( )

The deserialization recipe for Position3D assuming XCDR2 wire format is:
Position3D Deserialization Recipe:
DESER_DHEADER( )
DESER_MEMBER_HEADER(MemberId: 1, . . . )
DESER_PRIMITIVE( )
DESER_MEMBER_HEADER(MemberId: 3, . . . )
DESER_PRIMITIVE( )
DESER_MEMBER_HEADER(MemberId: 2, . . . )
DESER_PRIMITIVE( )

When a DataReader receives a Position2D data sample, the GeneralPlugin_deserialize function, which deserializes the sample by executing the Position3D recipe, cannot execute the instructions in order. If it did, the value y would be deserialized as z. Instead, the GeneralPlugin_deserialize must locate the instruction that deserializes a member value by using the member ID.

Figure 18:
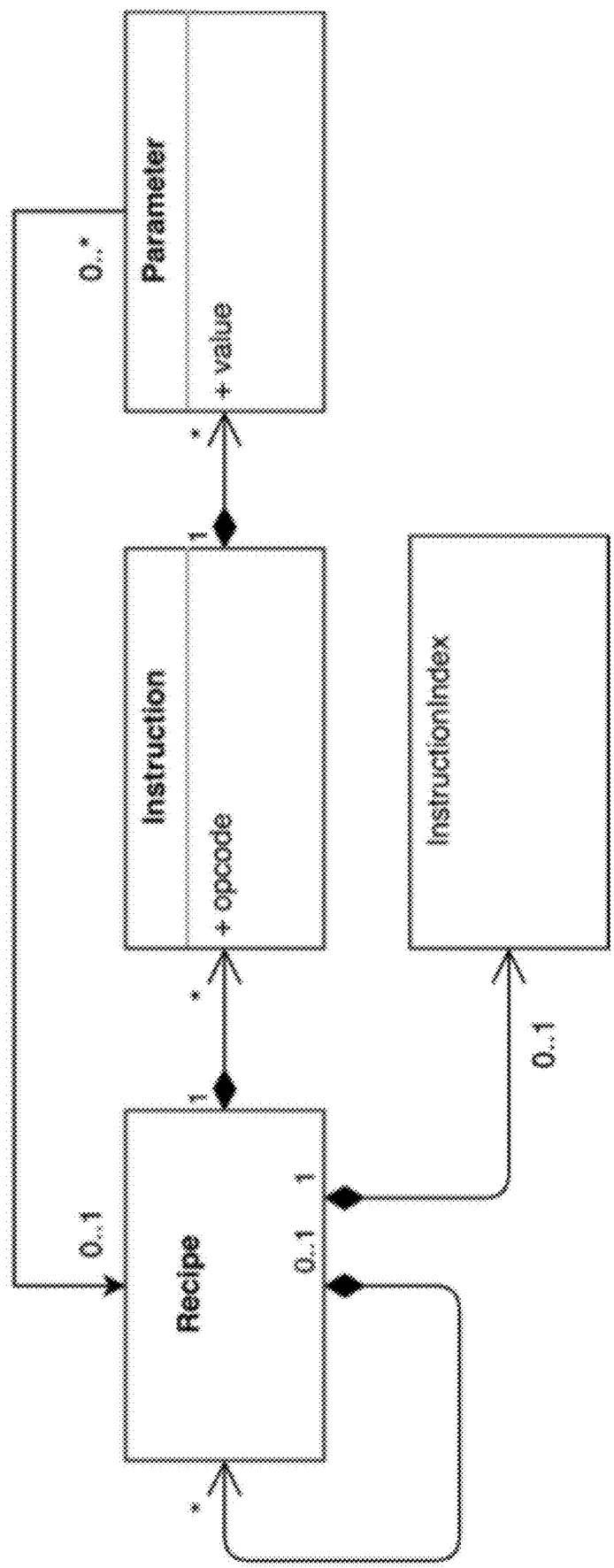
FIG. 18 shows a Recipe with Instruction Index Class Diagram according to an exemplary embodiment of the invention.

To make this search efficient, the RecipeGenerator_generate_recipe function will create a member ID index that will map a member ID to an instruction index. The index will be stored with the recipe (FIG. 18).

Instruction indexes can be implemented using a variety of data structures, including hash tables, B-Trees, and ordered lists of member IDs.

Member ID indexes for mutable types are generated only for the following recipes: DESER_RECIPE, SER_TO_KEY_RECIPE, and SKIP_RECIPE.

Union Discriminator Indexes

Unions define a well-known discriminator member and a set of type-specific members. The discriminator member is always considered to be the first member of a union. Each type-specific member is associated with one or more values of the discriminator. These values are identified in one of two ways:

They may be identified explicitly.

At most one member of the union may be identified as the "default" member; any discriminator value that does not explicitly identify another member is considered to identify the default member.

For example:

```
@final
enum ParameterKind {
    OCTET,
    SHORT,
    LONG
};
@final
union ParameterValue switch (ParameterKind) {
    case OCTET:
        octet octetVal;
    case SHORT:
        short shortVal;
    default:
        long longVal;
};
```

The serialization recipe for ParameterValue is:
ParameterValue Serialization Recipe.
SER_PRIMITIVE(Kind=ENUM, . . . ) // Discriminator serialization
SER_PRIMITIVE(Kind=OCTET)
SER_PRIMITIVE(Kind=SHORT)
SER_PRIMITIVE(Kind=LONG)

Figure 19:
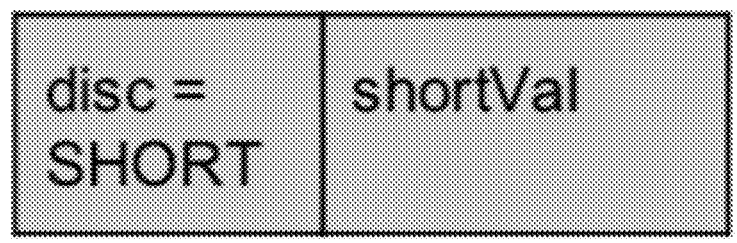
FIG. 19 shows a network representation of a union data sample with a short discriminator according to an exemplary embodiment of the invention.

When this program is executed, the GeneralPlugin_serialize only needs to serialize the value of the discriminator in the data sample, and the value of the member that is selected by the discriminator. For example, if the discriminator value is SHORT, the wire representation would be as shown in FIG. 19.

To make the selection of the member value instruction efficient, the RecipeGenerator_generate_recipe will create an index that will map a discriminator value to a member instruction index. The index will be stored with the recipe.

Discriminator indexes can be implemented using a variety of data structures, including hash tables, B-Trees, and ordered lists of possible discriminator values.

Discriminator indexes for unions are generated when any of the following conditions apply:
  RecipeKind is SER_RECIPE or GET_SER_SIZE_RECIPE.
  RecipeKind is DESER_RECIPE or SER_TO_KEY_RECIPE, or SKIP and type are not MUTABLE. For mutable types, it is not necessary to generate the discriminator index because the execution function can use the member ID index.

Single-Value Recipes

The following recipes generated by the function RecipeGenerator_generate_recipe do not receive a data sample as a parameter: GET_MAX_SER_SIZE_RECIPE and GET_MIN_SER_SIZE_RECIPE. As such, the result of executing the recipe is always the same: a single number representing the maximum serialized size of a data sample (GET_MAX_SER_SIZE_RECIPE) and a single number representing the minimum serialized size of a data sample (GET_MIN_SER_SIZE_RECIPE).

It does not make sense for the application to keep these recipes around after they run once. Because of that, when RecipeGenerator_generate_recipe generates the recipes, it executes them once, then stores the result as part of the recipe. Finally, it replaces all the instructions of the recipe with a single RETURN_PRIMITIVE. What is left is a single-value recipe with an O(1) execution time.

Recipe Generation Algorithm

Figure 20:
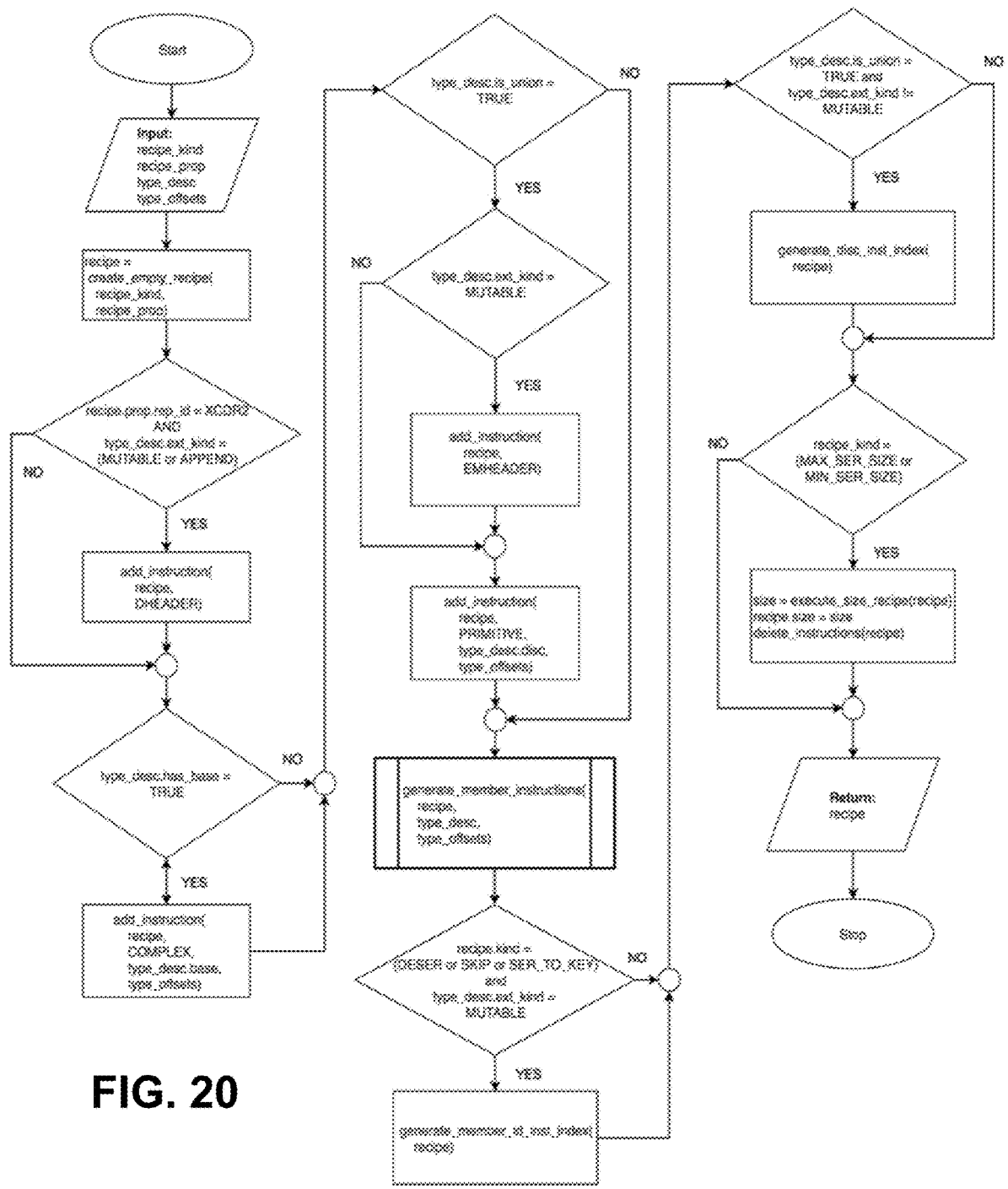
FIG. 20 shows RecipeGenerator_generate_recipe function according to an exemplary embodiment of the invention.
Figure 21:
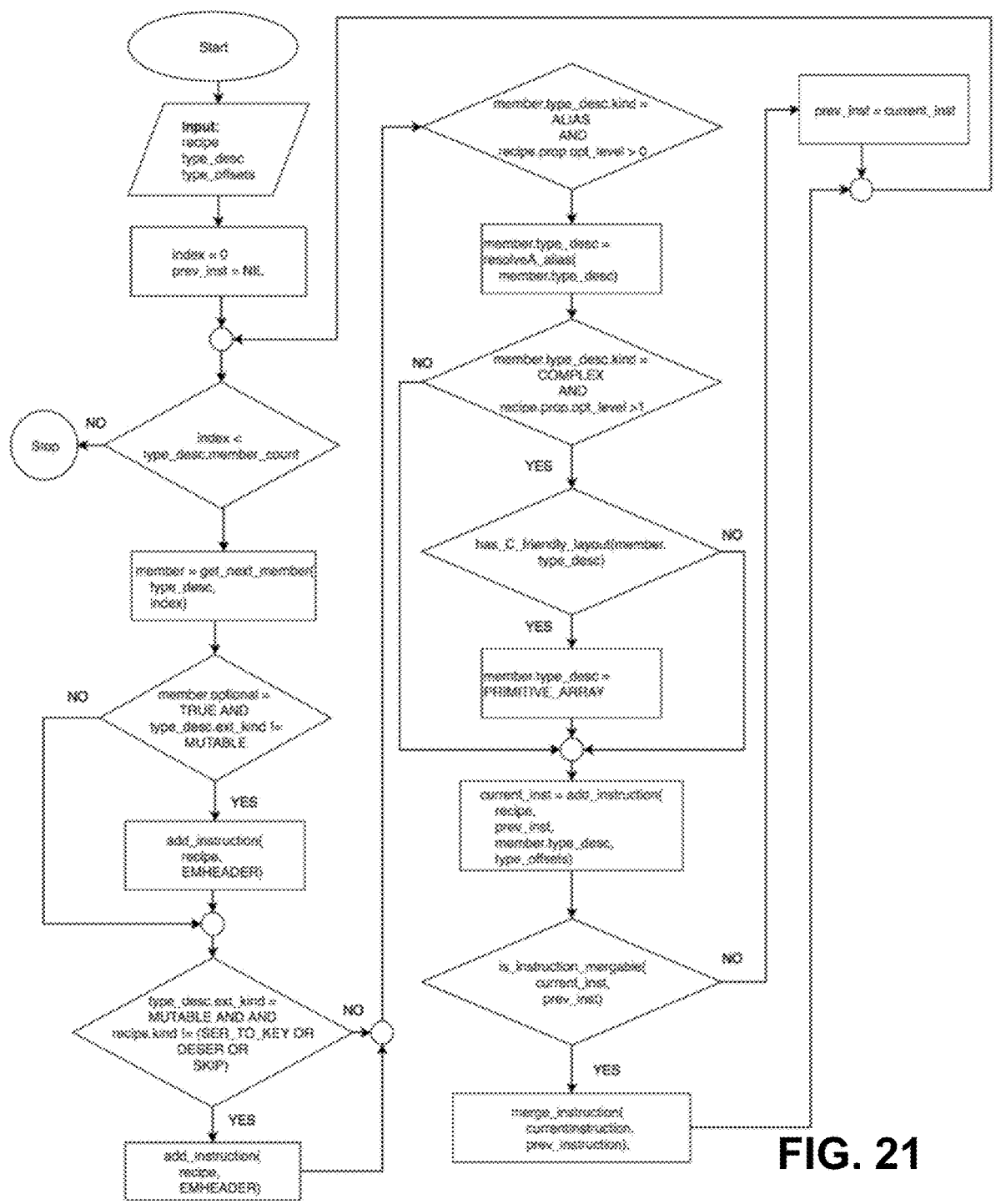
FIG. 21 shows detailed generate_member_instructions according to an exemplary embodiment of the invention.

FIG. 20 shows the RecipeGenerator_generate_recipe function. FIG. 21 shows the program generation process for a struct or union member (generate_member_instructions).

In the flowcharts of FIGS. 20-21:
  The add_instruction function adds a new instruction to the recipe. The instructions can be one of the instructions described in Instructions, and the selection is done based on the member type. The Alignment Optimizations are applied within this function. This function also populates the instruction parameters. For example, if a primitive member is marked with the @range annotation, the function will set CheckRange to TRUE, and it will set the range in the Range parameter.
  The hasCFriendlyLayout function determines if a complex type can be inlined by applying the rules described in Rules for Inline Expansion.
  The member ID and discriminator indexes described in Instruction Index are generated by the functions generate_member id ins index and generate_disc_inst_index.

Recipe Execution

The recipes generated by RecipeGenerator_generate_recipe are executed by the recipe functions described in Recipe Functions.

Serialization Functions

Figure 22:
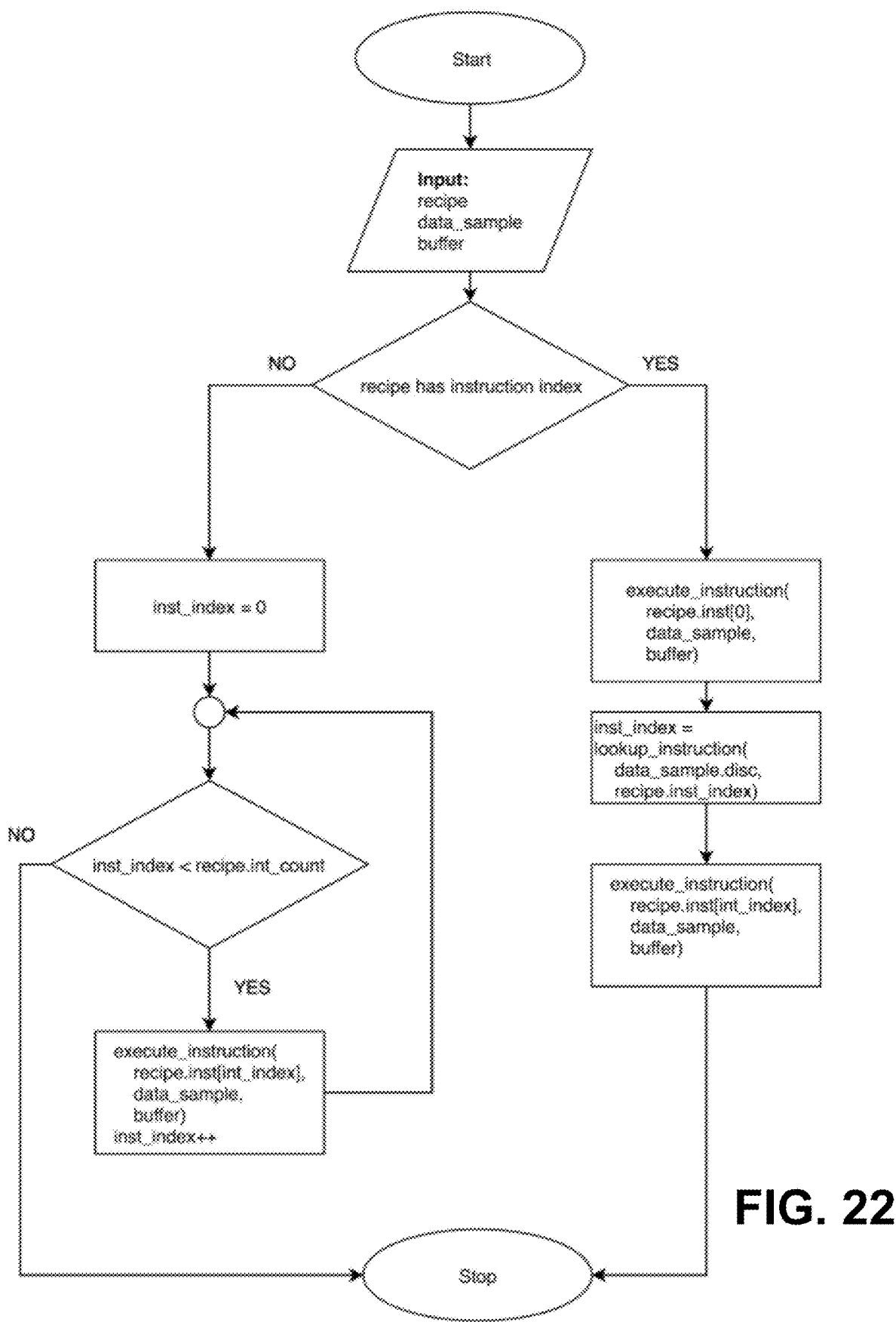
FIG. 22 shows Serialization Recipe Execution according to an exemplary embodiment of the invention.

The functions GeneralPlugin_serialize and GeneralPlugin_serialize_key receive the following parameters:

Recipe: The recipe to be executed.
DataSample: The data sample to which the operation applies.
NetworkBuffer: The buffer in which the data sample will be serialized These functions have two different flows depending on whether or not there is an instruction index as shown in FIG. 22. For serialization, there will be an instruction index only when the type is a union.

The execute_instruction function executes an instruction. For serialization recipes, this involves:

Copying (or serializing) the value of a member in memory into the network buffer. This operation may require byte swapping depending on the value of the Endianness property that was used to generate the recipe and the endianness of the memory representation. The OMG Extensible and Dynamic Topic Types for DDS (DDS-XTYPES) specification describes how to serialize each possible member type, including primitive types, constructed types, collection types, and aggregated types.

For primitive members, checking that the member value is within the allowed range when the @range, @min, or @max annotations are used.

For complex instructions, executing the program associated with the complex instruction.

For header instructions, serializing the header into the network buffer and populating its value.

Deserialization Functions

The functions GeneralPlugin_deserialize, GeneralPlugin_deserialize_key, and GeneralPlugin_serialized_sample_to_key receive the following parameters:

Recipe: The recipe to be executed.
NetworkBuffer: The network buffer containing the serialized data sample.
DataSample: The data sample in which the network buffer will be deserialized.

The algorithm is the same as the one for serialization. The only difference is in the execute_instruction operation, which copies the network value for a member into the memory representation.

Also, the instruction index can be a member ID index or a discriminator index. See Instruction Index for information about the conditions that trigger the generation of an instruction index.

Get Serialized Size Function

The function GeneralPlugin_get_serialized_size receives the following parameters:

Recipe: The recipe to be executed.
DataSample: The data sample to which the operation applies.

The way the operation works is identical to the way the serialization functions work. Instead of having a real network buffer, this function uses a logical network buffer. It never copies values into the network buffer, but it advances the position.

Skip Function

The function GeneralPlugin_skip receives the following parameters:

Recipe: The recipe to be executed.
NetworkBuffer: The network buffer containing the serialized data sample.

If the recipe has a DHEADER instruction, the operation skips the data sample by advancing the network buffer position N-bytes, where N is the size contained in the DHEADER, which is serialized at the beginning of the NetworkBuffer.

If the recipe does not have a DHEADER, the way the operation works is identical to the way the deserialization functions work. Instead of copying the member values from the network buffer into the data sample, this function just advances the position of the buffer.

Get Max/Min Serialized Size Functions

The functions GeneralPlugin_get_max_serialized_size and GeneralPlugin_get_min_serialized_size do not operate on a data sample but on the type.

These functions are invoked first by the RecipeGenerator_generate_recipe function to generate single-value recipes. Single-value recipes are recipes with a single RETURN_PRIMITIVE instruction that returns a constant value. In this case, the value represents the maximum serialized size or the minimum serialized size of a data sample for a type. For additional information on single-value recipes, see Single-Value Recipes.

Optimized Execution Functions

To reduce the number of CPU cycles required to execute a recipe, the Recipe-Driven Interpreter may provide alternative execution functions that only work on types with certain properties. For example, assume this type:

```
@appendable
struct Position3D {
int32 x;
int32 y;
int32 z; };
```

The Position3D type is a type that only contains primitive members. These types are quite common in DDS type systems.

For types like the one in the previous example, the Recipe-Driven Interpreter may provide a new set of serialization/deserialization execution functions that only work with recipes on types containing only primitive members:

GeneralPlugin_primitive_serialize
GeneralPlugin_primitive_deserialize
GeneralPlugin_primitive_serialize_key
GeneralPlugin_primitive_deserialize_key The RecipeGenerator_generate_recipe operation will store with the recipe the execution functions that should be used to execute the recipe. This decision is made at recipe generation time.

Recipe Set

The generation of recipes for a type may require generating different versions of the same recipe (e.g., DESER_RECIPE) for the type. For example, if a DataReader can receive both XCDR1 and XCDR2 wire representations, it will be necessary to generate two versions of the DESER_RECIPE, one for XCDR1 and one for XCDR2.

Variations of the same recipe are grouped together in a RecipeSet.

By default, a RecipeSet contains 8 different recipes that are the result of selecting the different combinations for (Endianness, RepresentationId, OnlyKey).

The user can limit the number of recipes on a RecipeSet as follows:

By annotating the type using the DDS @allowed_data representation annotation, the user can select XCDR1 or XCDR2 representation. For example:

```
@allowed_data_representation(XCDR2)
struct CameraImage {
@key int32 cameraId;
```

Resolution resolution;

```
    sequence<octet> pixels;
};
```

By marking the type as XCDR2, the Code Generator application or the application at run-time will not have to generate XCDR1 recipes for the type.

Types that do not have members marked as @key do not require recipe generation (for key members only).

Recipe-Driven Interpreted Data Sample Manipulation Performance

The generation of recipes after preprocessing the IDL type allows applying performance optimizations that in many cases will make the data sample operations run faster than with a traditional functional data sample manipulation approach (see Functional Data Sample Manipulation).

The following examples compare the performance of Connext DDS 6.0.0, which uses the recipe-driven data manipulation invention described in this document, with the performance of Connext DDS 5.3.1, which does Functional data sample manipulation. (Connext DDS is the DDS implementation of Real-Time Innovations.)

| Optimization Level 1 |
| --- |
| typedef double Temperature;<br>typedef int32 PulseRate;<br>typedef int32 RespirationRate;<br>typedef int32 BloodPressure;<br>@final @allowed_data_representation(XCDR)<br>struct VitalSigns {<br>    Temperature temperature;<br>    PulseRate pulse;<br>    RespirationRate respiration;<br>    BloodPressure diastolic_pressure;<br>    BloodPressure systolic_pressure;<br>}; |

Figure 23:
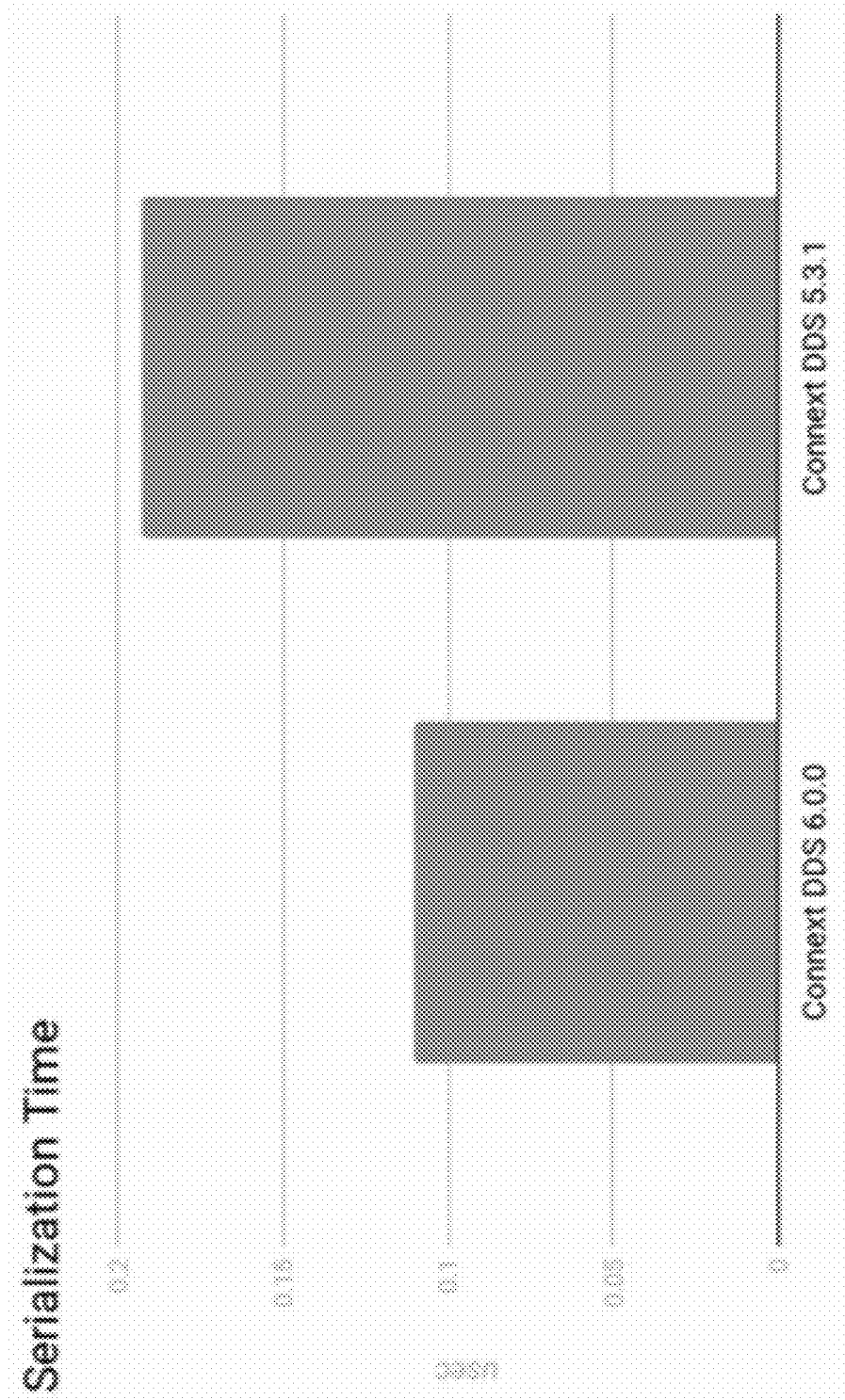
FIG. 23 shows a serialization time for VitalSigns with Optimization Level 1 according to an exemplary embodiment of the invention.

The serialization time for VitalSigns with Optimization Level 1 is shown in FIG. 23.

| Optimization Level 2 |
| --- |
| @final<br>struct PixelRGB { int16 r;<br>int16 g;<br>int16 b;<br>};<br>@final<br>struct Image{<br>PixelRGB data[786432];<br>}; |

Figure 24:
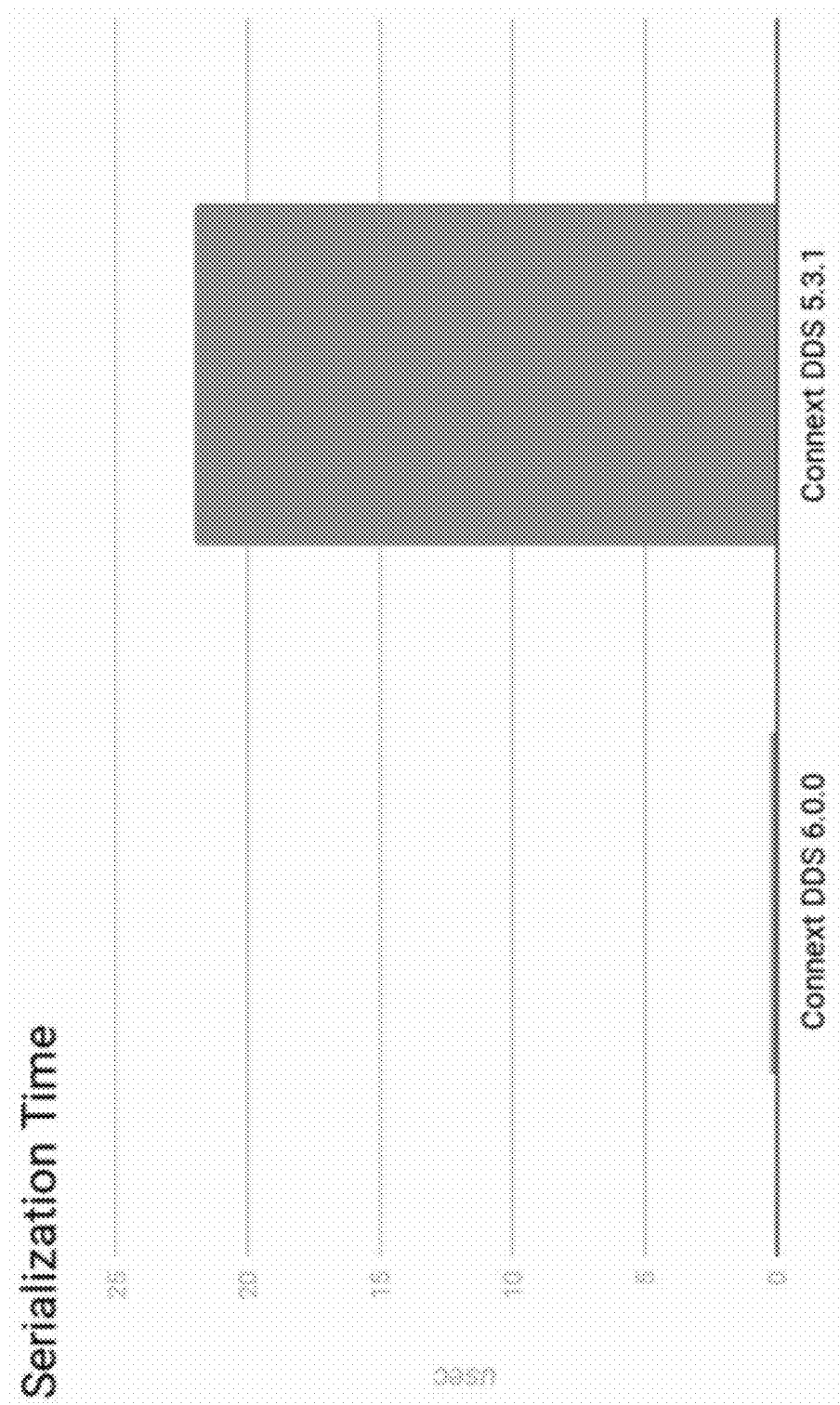
FIG. 24 shows a serialization time for Image with Optimization Level 2 according to an exemplary embodiment of the invention.

The serialization time for Image with Optimization Level 2 is shown in FIG. 24.

What is claimed is:

1. A method for manipulating data samples associated with a DDS type in a system using an Object Management Group (OMG) Data Distribution Service (DDS) and a Real-Time Publish Subscribe (RTPS) protocol, the method comprising:
   (a) having a memory representation of the data samples;
   (b) having a network representation of the data samples;
   (c) generating one or more conversion recipes using a type description and a language binding information that transforms any data sample associated with the type description (i) from the memory representation to the network representation, (ii) from the network representation to the memory representation, or (iii) a combination of (i) and (ii), wherein the one or more conversion recipes are generated only once; and
   (d) execution of the generated one or more conversion recipes on all data samples,
wherein access of a data sample member in the memory representation is performed using a relative offset with respect to a beginning of the data sample or a sample accessor interface.

2. The method as set forth in claim 1, wherein access of the data sample member in the memory representation is independent of a target language binding.

3. The method as set forth in claim 1, wherein the one or more conversion recipes are generated at run-time or by a Code Generation application.

4. The method as set forth in claim 1, wherein the one or more conversion recipes contains a list of operational instructions and parameters for each instruction indicating how to perform an operation on the data sample.

5. The method as set forth in claim 4, wherein the operational instructions are independent of a target language binding.

6. The method as set forth in claim 1, wherein the one or more conversion recipes can be generated only for a subset of the members in a data sample.

7. The method as set forth in claim 1, wherein the one or more conversion recipes can be generated only for the key members in a data sample.

8. The method as set forth in claim 1, further comprising generating multiple versions of the one or more conversion recipes for the same type description and operation using different recipe properties to work with different network representations and endianness coexisting in the DDS system.

9. The method as set forth in claim 1, further comprising generating the one or more conversion recipes with one or more optimizations levels to reduce execution time and improve communication latency in the conversion.

10. The method as set forth in claim 9, wherein the optimizations are based on detecting portions of the data sample that are equal in the memory representation and the network representation.

11. The method as set forth in claim 9, wherein the optimizations are based on flattening out the data sample type into an equivalent type.

12. The method as set forth in claim 1, wherein the method is a computer-implemented method executable by computer hardware, a computer code where the methods steps are executable by a computer processor, a method distributed over an Internet whereby the method steps are executed by a computer server.

13. A method for bidirectional conversion between a memory representation and a network representation of data samples associated with a DDS type in a system using an Object Management Group (OMG) Data Distribution Service (DDS) and a Real-Time Publish Subscribe (RTPS) protocol, the method comprising:
(a) having a first memory representation of the data samples;
(b) having a second memory representation of the data samples;
(c) having a network representation of the data samples;
(d) generating a first conversion recipe using a type description and a language binding information that transforms any data sample associated with the type description from the first memory representation to the network representation, wherein the first conversion recipe is generated only once;
(e) generating a second conversion recipe using a type description and language binding information that transforms any data sample associated with the type description from the network representation to the second memory representation, wherein the second conversion recipe is generated only once; and
(f) execution of the generated first and second conversion recipes on all data samples,
wherein access of a data sample member in the first or the second memory representation is performed using a relative offset with respect to a beginning of the data sample or a sample accessor interface.

14. The method as set forth in claim 13, wherein the first memory representation and the second memory representation are equal or different from each other.

15. The method as set forth in claim 13, wherein access of the data sample member in the first or the second memory representation is independent of a target language binding.

16. The method as set forth in claim 13, wherein the first and the second conversion recipes are generated at run-time or by a Code Generation application.

17. The method as set forth in claim 13, wherein the first and the second conversion recipes contains a list of operational instructions and parameters for each instruction indicating how to perform an operation on the data sample.

18. The method as set forth in claim 17, wherein the operational instructions are independent of a target language binding.

19. The method as set forth in claim 13, wherein the first or the second conversion recipe can be generated only for a subset of the members in a data sample.

20. The method as set forth in claim 13, wherein the first or the second conversion recipe can be generated only for the key members in a data sample.

21. The method as set forth in claim 13, further comprising generating multiple versions of the first or the second conversion recipes for the same type description and operation using different recipe properties to work with different network representations and endianness coexisting in the DDS system.

22. The method as set forth in claim 13, further comprising generating the first or the second conversion recipes with one or more optimizations levels to reduce execution time and improve communication latency in the bidirectional conversion.

23. The method as set forth in claim 22, wherein the optimizations are based on detecting portions of the data sample that are equal in the memory representation and the network representation.

24. The method as set forth in claim 22, wherein the optimizations are based on flattening out the data sample type into an equivalent type.

25. The method as set forth in claim 13, wherein the method is a computer-implemented method executable by computer hardware, a computer code where the methods steps are executable by a computer processor, a method distributed over an Internet whereby the method steps are executed by a computer server.

* * * * *